(12) United States Patent
Mardirossian et al.

(10) Patent No.: US 10,359,847 B2
(45) Date of Patent: Jul. 23, 2019

(54) ADVERTISEMENT VIEWING BYPASS PREVENTION USER INTERFACE COMPONENT

(71) Applicant: The DIRECTV Group, Inc., El Segundo, CA (US)

(72) Inventors: Arpi Mardirossian, Pasadena, CA (US); Vladislav Kolegayev, Los Angeles, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 574 days.

(21) Appl. No.: 14/981,590

(22) Filed: Dec. 28, 2015

(65) Prior Publication Data
US 2017/0185260 A1    Jun. 29, 2017

(51) Int. Cl.
*G06F 3/0481*    (2013.01)
*G06F 3/0484*    (2013.01)
(Continued)

(52) U.S. Cl.
CPC .......... *G06F 3/016* (2013.01); *G06F 3/04847* (2013.01); *G06F 3/04855* (2013.01); *G06F 3/04883* (2013.01); *G06F 3/04886* (2013.01); *G06Q 30/0277* (2013.01); *H04N 21/42224* (2013.01); *H04N 21/4316* (2013.01); *H04N 21/47217* (2013.01); *H04N 21/812* (2013.01)

(58) Field of Classification Search
CPC .. G06F 3/04812; G06F 3/016; G06F 3/04847; G06F 3/04886; G06Q 30/0277; H04N 21/42224; H04N 21/4316; H04N 21/47217; H04N 21/812

USPC ........................................................ 715/720
See application file for complete search history.

(56) References Cited

U.S. PATENT DOCUMENTS

| 9,361,011 B1 | 6/2016 | Burns et al. |
| 2007/0136679 A1* | 6/2007 | Yang .................. H04N 5/44513 715/772 |

(Continued)

OTHER PUBLICATIONS

Notice of Allowance dated May 1, 2018 for U.S. Appl. No. 14/981,551.

(Continued)

*Primary Examiner* — Tadesse Hailu
*Assistant Examiner* — Darrin Hope
(74) *Attorney, Agent, or Firm* — Gates & Cooper LLP

(57) ABSTRACT

A method, system, computer program product, and computer readable storage medium provide the ability to prevent bypass of advertisement viewing. A media content user interface component (that controls playback of the media content and an advertisement in a media player) is activated. The component includes a circular progress bar and a progress marker that coincides with the circular progress bar. As the media content is playing, the progress marker moves around the circular progress bar reflecting a progress of the playing. At a defined point in the media content, an advertisement is played. User input advances the progress marker along the circular progress bar to fast forward the media content. Upon an attempt to advance the progress marker a defined threshold distance beyond the advertisement, the progress marker is snapped back to the advertisement thereby preventing bypass of viewing the advertisement.

18 Claims, 19 Drawing Sheets

(51) Int. Cl.
*G06F 3/0488* (2013.01)
*G06F 3/01* (2006.01)
*H04N 21/472* (2011.01)
*H04N 21/431* (2011.01)
*H04N 21/422* (2011.01)
*G06Q 30/02* (2012.01)
*H04N 21/81* (2011.01)
*G06F 3/0485* (2013.01)

(56) References Cited

U.S. PATENT DOCUMENTS

| | | | |
|---|---|---|---|
| 2009/0051660 A1* | 2/2009 | Feland, III | G06F 3/04883 345/173 |
| 2010/0275123 A1 | 10/2010 | Yu et al. | |
| 2011/0157046 A1 | 6/2011 | Lee et al. | |
| 2012/0030636 A1* | 2/2012 | Miyazaki | G06F 3/0488 715/863 |
| 2012/0070129 A1 | 3/2012 | Lin et al. | |
| 2013/0247091 A1* | 9/2013 | Wong | H04N 21/47217 725/32 |
| 2015/0026719 A1 | 1/2015 | Menon | |
| 2015/0205511 A1 | 7/2015 | Vinna et al. | |
| 2015/0378462 A1* | 12/2015 | Chakirov | G06F 3/0488 715/720 |
| 2016/0104513 A1 | 4/2016 | Bloch et al. | |

OTHER PUBLICATIONS

Garnett, A., "How to control your PC with your Android phone", published Apr. 9, 2013, pcworld.com, pp. 1-9, https://www.pcworld.com/article/2033284/how-to-control-your-pc-with-your-android-phone.html, as downloaded Apr. 9, 2019.

Wikipedia, "Technology of Television", section: Aspect Ratios, https://en.wikipedia.org/wiki/Technology_of_television (Year: 2018), pp. 1-7, as downloaded Apr. 9, 2019.

Non-Final Office Action dated Mar. 20, 2019 for U.S. Appl. No. 14/981,530.

* cited by examiner

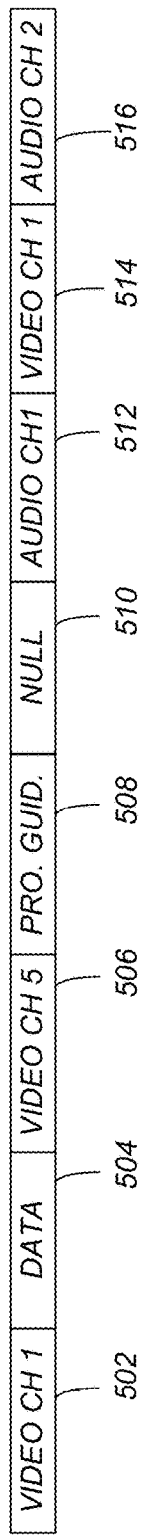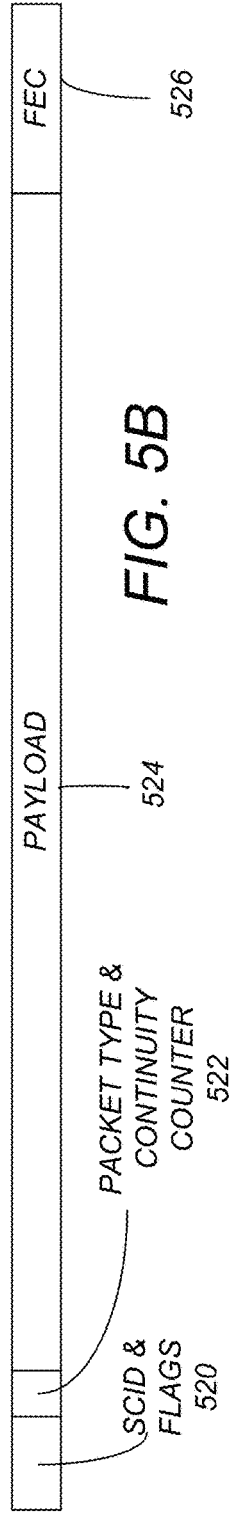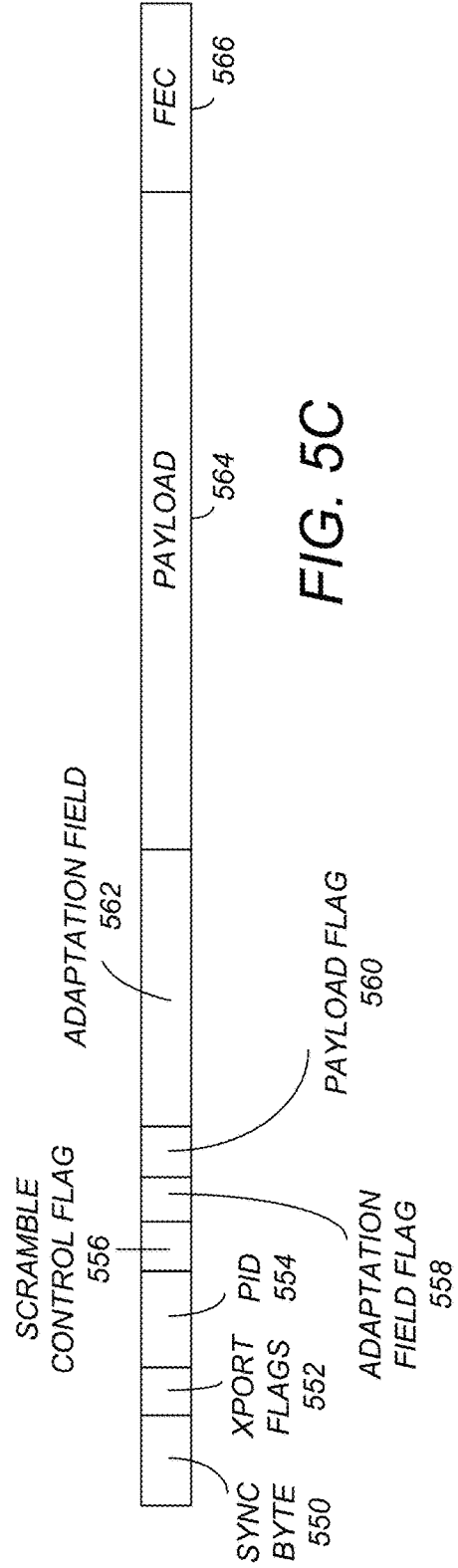

ADVERTISEMENT VIEWING BYPASS PREVENTION USER INTERFACE COMPONENT

BACKGROUND OF THE INVENTION

1. Technical Field

Embodiments of the present invention relate generally to controlling media content playback, and in particular, to a method, system, apparatus, article of manufacture, and computer program product for a user interface (UI) component used to control and navigate media content playback, bookmark a frame in media content, and prevent a bypass of advertisements during the playback of media content.

2. Description of the Related Art

Touchscreen devices are often used to view and/or control the viewing of media content. For example, a tablet computer (e.g., an iPad™) or smartphone may be used to watch a video, play a slide show, listen to audio, etc. Similarly, a tablet computer, smartphone, or other touchscreen device may serve as a remote control to control the viewing of media content that is displayed on another device (e.g., on a television, a display device of a computer, a camera display, a monitor, etc.). Unfortunately, prior art systems fail to provide an understandable, intuitive, easy-to-use tool/widget/graphical UI that enables such control. To better understand the problems of the prior art, a description of prior art media content controls may be useful.

FIG. 1 illustrates a prior art video control playback UI (e.g., on an iPad™). Once the user has initiated playback of video content, the UI 100 is displayed. The actual video content is displayed in video playback area 102 with the video playback controls displayed in areas 104 and 106. The video playback controls may be shown or hidden by tapping on video playback area 102. The user may scale the video to fit the screen by double-tapping the video or selecting icon 108. The playhead 110 identifies the current playback location of the video clip/content. Playhead 110 can be dragged along linear scrubber bar 112 to skip forward or back thereby identifying a particular frame/time within a video clip. In FIG. 1, the playhead 110 is located at 10:39 of the clip and there is 1:29:18 remaining left of the video clip/content.

To start over from the beginning of the video clip/content, the playhead 110 may be dragged along the scrubber bar 112 all the way to the left or the user may select icon 114 (if there are no chapters in the video). To skip to the next or previous chapter, the user may select/tap icons 114/116 respectively. To rewind or fast-forward, the user may touch and hold icons 114/116, or may drag playhead 110 left or right. The user can move their finger toward the bottom of screen 100 as the user drags for finer control. The user can play/pause the playback of video content by touching icon 118. Scrubber bar 120 may be used to control the volume using volume control head 122.

As illustrated in FIG. 1, the playback controls 108-122 are linear and require the user to lift his/her hand and drag one or more fingers across a screen 100 in a linear manner to identify a playback location and/or adjust the volume. Further, the playback scrubber bar 112 and volume control scrubber bar 120 are not integrated into a single interface component and must therefore be separately manipulated using hand/finger gestures in different areas of the screen 100.

In view of the above, what is needed is a touchscreen UI component for media content playback controls that is intuitive, easy-to-use, and conforms to the natural gestures of a user's hand digits/phalanges.

SUMMARY OF EMBODIMENTS OF THE INVENTION

Embodiments of the invention overcome the problems of the prior art by utilizing a circular user interface (UI) component for media content playback controls. The UI component provides a circular layout with UI elements for playing, pausing, fast forwarding, rewinding, displaying thumbnail snapshots of scenes (while rewinding and fast forwarding), volume control, closed captioning, and toggling full screen video playback. The UI component also provides a UI element used for identifying and bookmarking particular frames within the media content for later retrieval and use. Further, the UI component provides a feature that prevents a user from bypassing the viewing of advertisement insertions (during video playback) by automatically snapping the user back to the advertisement (e.g., the beginning of the advertisement and/or where the user left off viewing the advertisement) when an attempt is made to fast forward beyond the advertisement.

BRIEF DESCRIPTION OF THE DRAWINGS

Referring now to the drawings in which like reference numbers represent corresponding parts throughout:

FIG. 5A is a diagram of a representative data stream in accordance with one or more embodiments of the invention;

FIG. 5B is a diagram showing one embodiment of a data packet for one transport protocol that can be used with embodiments of the present invention;

FIG. 5C is a diagram showing another embodiment of a data packet for the MPEG-2 protocol in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provided a UI component for media content player controls. Such a UI component may be displayed/provided via a touchscreen control device, tactile device, or other device that is capable of displaying the UI. In this regard, embodiments of the invention may be displayed on a remote control, a smartphone, a tablet computer, a television monitor, a computer monitor, etc. To provide a better understanding of potential implementations/environments, set forth below are descriptions of a satellite television distribution system and its components, as well as computer hardware/software.

Satellite Television Distribution System and Components

Distribution System

Figure 1:
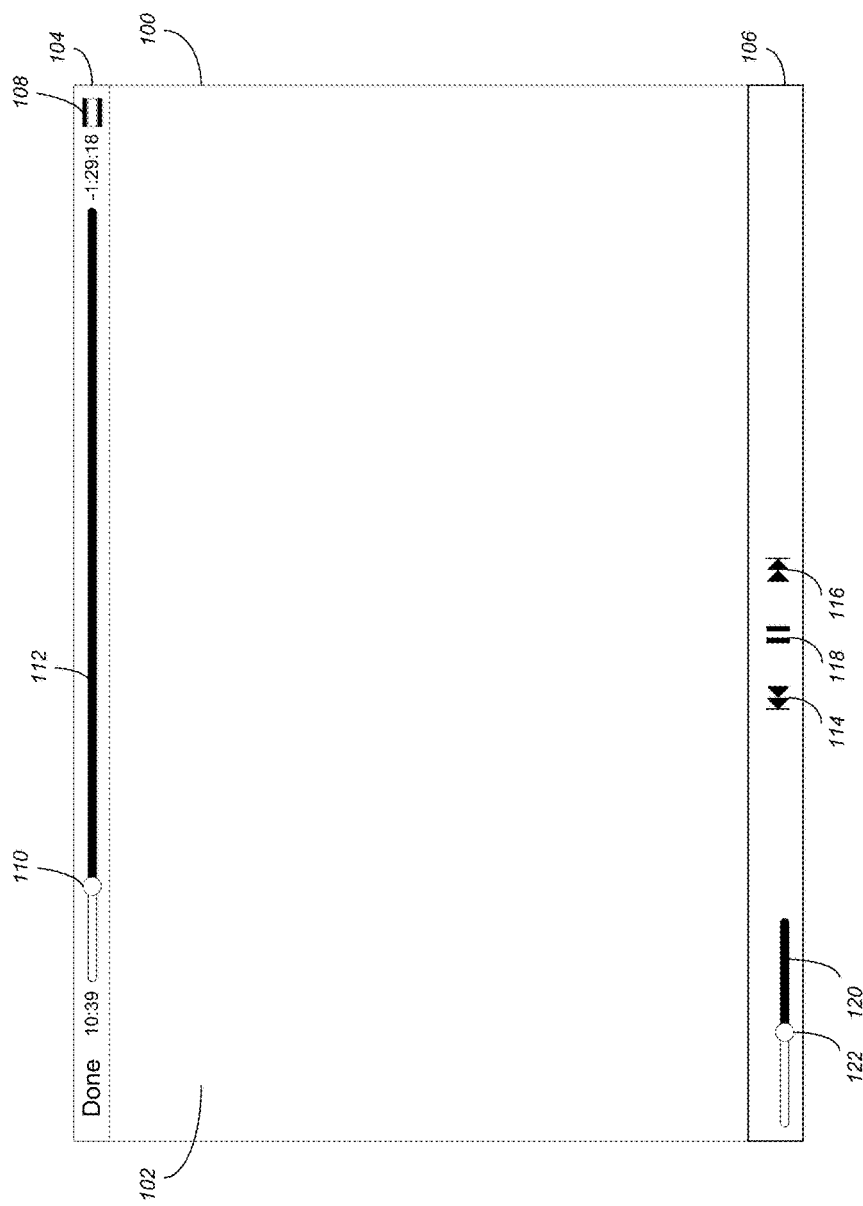
FIG. 1 illustrates a prior art video control playback UI (e.g., on an iPad™)
Figure 2:
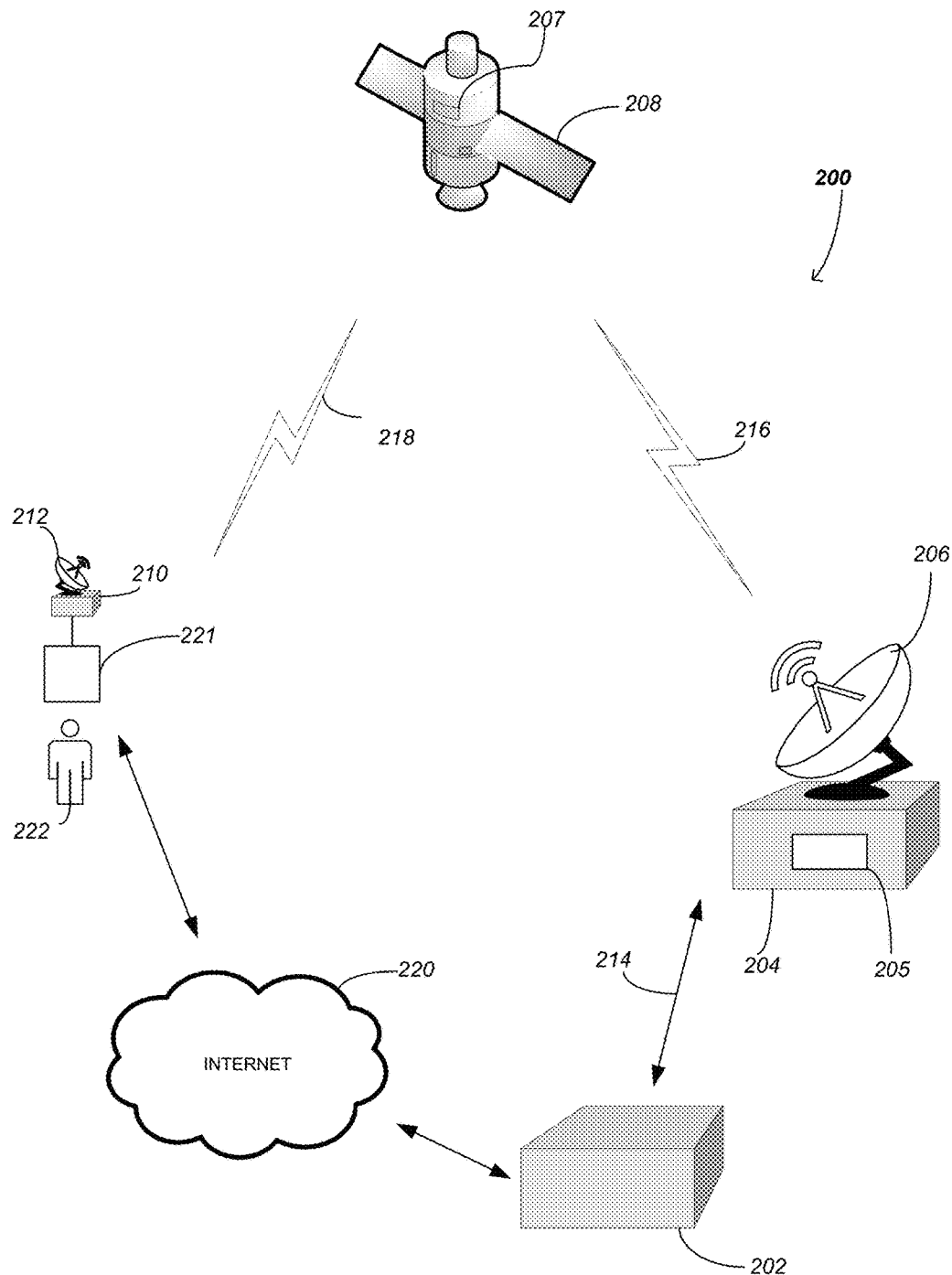
FIG. 2 is a diagram illustrating an overview of a distribution system that can be used to provide video data, software updates, and other data to subscribers in accordance with one or more embodiments of the invention.

FIG. 2 is a diagram illustrating an overview of a distribution system 200 that can be used to provide video data, software updates, and other data to subscribers. The distribution system 200 comprises a control center 202 in communication with an uplink center 204 (together hereafter alternatively referred to as a headend) via a ground or other link 214 and with a subscriber receiver station 210 via the Internet 220, a public switched telephone network (PSTN) or other link. The control center 202, or headend provides program material (e.g. video programs, audio programs, software updates, and other data) to the uplink center 204 and coordinates with the subscriber receiver stations 210 to offer, for example, pay-per-view (PPV) program services, including billing and associated decryption of video programs.

The uplink center receives program material and program control information from the control center 202, and using an uplink antenna 206 and transmitter 205, transmits the program material and program control information to the satellite 208. The satellite 208 receives and processes this information, and transmits the video programs and control information to the subscriber receiver station 210 via downlink 218 using one or more transponders 207 or transmitters. The subscriber receiving station 210 comprises a receiver communicatively coupled to an outdoor unit (ODU) 212 and a display 221. The receiver processes the information received from the satellite 208 and provides the processed information to the display 221 for viewing by the subscriber 222. The ODU 212 may include a subscriber antenna and a low noise block converter (LNB).

In one embodiment, the subscriber receiving station antenna is an 18-inch slightly oval-shaped antenna. Standard definition transmissions are typically in the Ku-band, while the high definition (HD) transmissions are typically in the Ka band. The slight oval shape is due to the 22.5 degree offset feed of the LNB which is used to receive signals reflected from the subscriber antenna. The offset feed positions the LNB out of the way so it does not block any surface area of the antenna minimizing attenuation of the incoming microwave signal.

The distribution system 200 can comprise a plurality of satellites 208 in order to provide wider terrestrial coverage, to provide additional channels, or to provide additional bandwidth per channel. In one embodiment of the invention, each satellite comprises 16 transponders to receive and transmit program material and other control data from the uplink center 204 and provide it to the subscriber receiving stations 210. Using data compression and multiplexing techniques, two satellites 208 working together can receive and broadcast over 150 conventional (non-HDTV) audio and video channels via 32 transponders.

While embodiments of the invention disclosed herein will be described with reference to a satellite based distribution system 200, embodiments of the invention may also be practiced with terrestrial-based transmission of program information, whether by broadcasting means, cable, or other means. Further, the different functions collectively allocated among the control center 202 and the uplink center 204 as described above can be reallocated as desired without departing from the intended scope of embodiments of the present invention.

Although the foregoing has been described with respect to an embodiment in which the program material delivered to the subscriber 222 is video (and audio) program material such as a movie, the foregoing method can be used to deliver program material comprising purely audio information or other data as well. It is also used to deliver current receiver software and announcement schedules for the receiver to rendezvous to the appropriate downlink 218. Link 220 may be used to report the receiver's current software version.

Uplink Configuration

Figure 3:
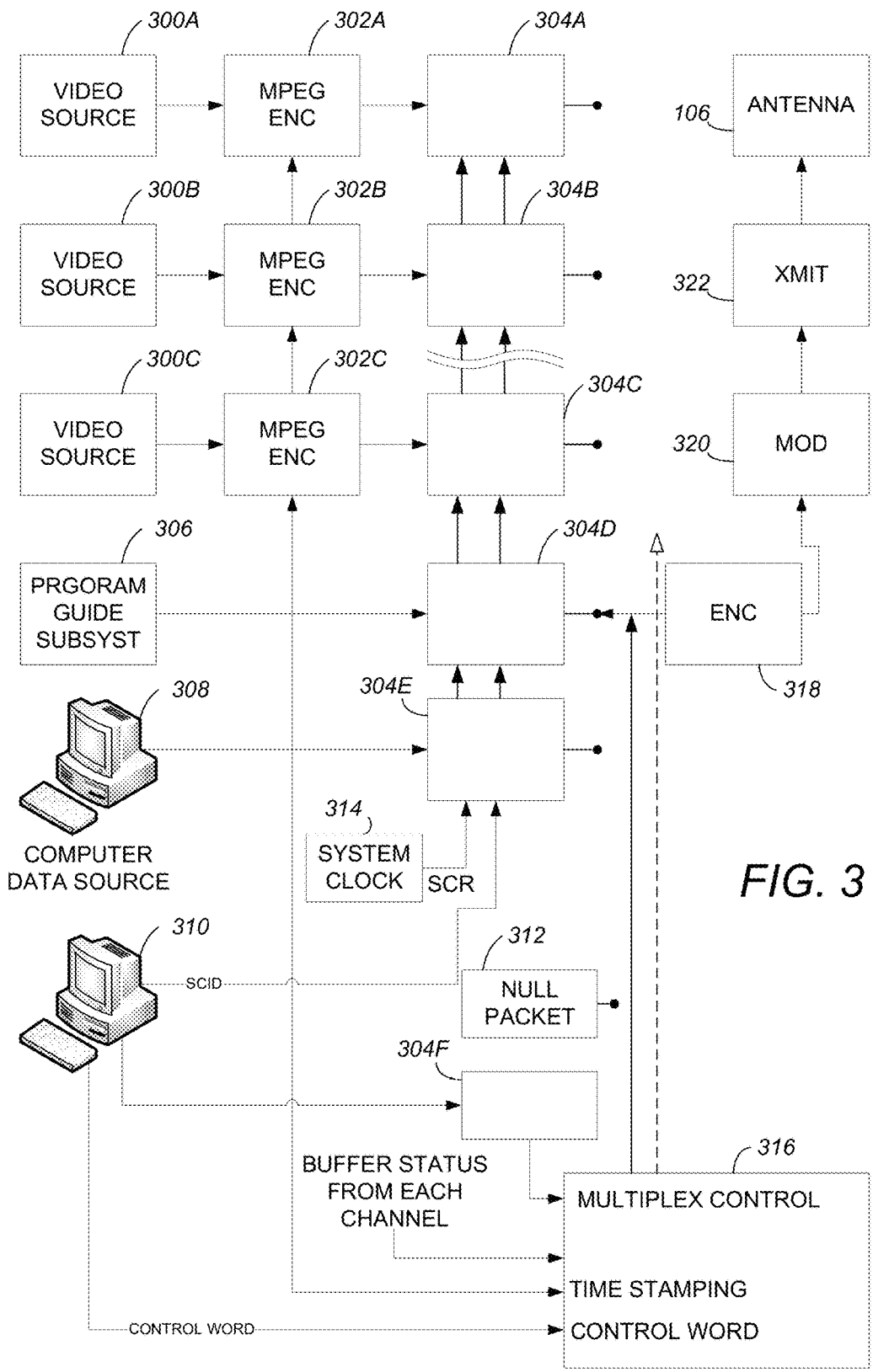
FIG. 3 is a block diagram showing a typical uplink configuration for a single satellite transponder, showing how video program material is uplinked to the satellite by the control center and the uplink center in accordance with one or more embodiments of the invention.

FIG. 3 is a block diagram showing a typical uplink configuration for a single satellite 108 transponder, showing how video program material is uplinked to the satellite 108 by the control center 102 and the uplink center 104. FIG. 3 shows three video channels (which could be augmented respectively with one or more audio channels for high fidelity music, soundtrack information, or a secondary audio program for transmitting foreign languages), a data channel from a program guide subsystem 306 and computer data information from a computer data source 308.

The video channels are provided by a program source of video material 300A-300C (collectively referred to hereinafter as video source(s) 300). The data from each video program source 300 is provided to an encoder 302A-302C (collectively referred to hereinafter as encoder(s) 302). Each of the encoders accepts a program time stamp (PTS) from the controller 316. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 302 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 302, the signals are converted into data packets by a packetizer 304A-304F (collectively referred to hereinafter as packetizer(s) 304) associated with each source 300.

The data packets are assembled using a reference from the system clock 314 (SCR), and from the conditional access manager 310, which provides the SCID to the packetizers 304 for use in generating the data packets. These data packets are then multiplexed into serial data and transmitted.

Program Guide Subsystem

Figure 4:
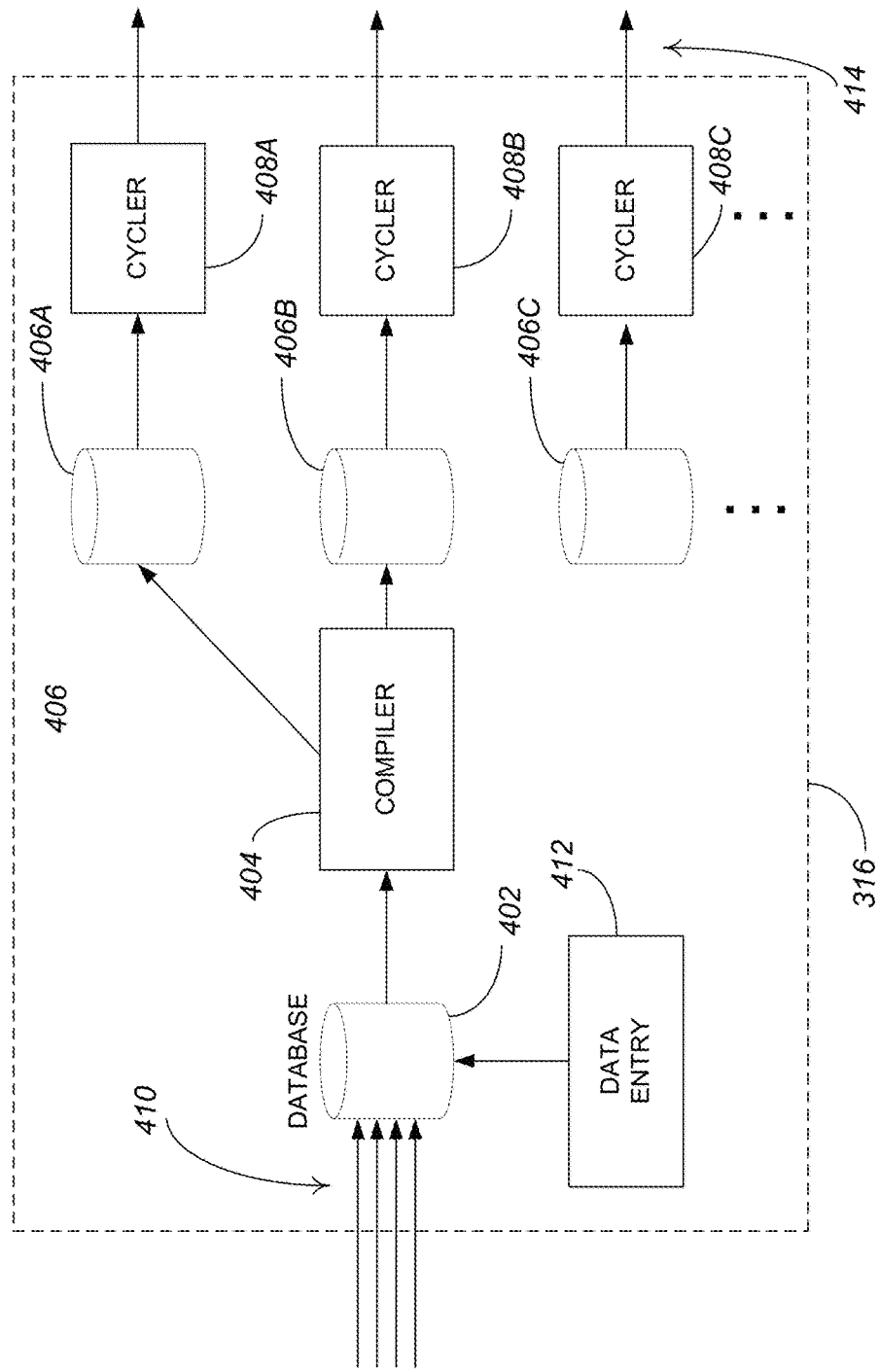
FIG. 4 is a block diagram of one embodiment of the program guide services/subsystem in accordance with one or more embodiments of the invention.

FIG. 4 is a block diagram of one embodiment of the program guide services/subsystem 316. The program guide data transmitting system 316 includes program guide database 402, compiler 404, sub-databases 406A-406C (collectively referred to as sub-databases 406) and cyclers 408A-408C (collectively referred to as cyclers 408).

Schedule feeds 410 provide electronic schedule information about the timing and content of various television channels, such as that found in television schedules contained in newspapers and television guides. Schedule feeds 410 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines or the Internet to program guide database 402. These companies provide television schedule data for all of the television stations across the nation plus the nationwide channels, such as SHOWTIME, HBO, and the DISNEY CHANNEL. The specific format of the data that are provided by these companies varies from company to company. Program guide database 402 preferably includes schedule data for television channels across the entire nation including all nationwide channels and local channels, regardless of whether the channels are transmitted by the transmission station.

Program guide database 402 is a computer-based system that receives data from schedule feeds 410 and organizes the data into a standard format. Compiler 404 reads the standard form data out of program guide database 402, identifies common schedule portions, converts the program guide data into the proper format for transmission to users (specifically, the program guide data are converted into objects as discussed below) and outputs the program guide data to one or more of sub-databases 408.

Program guide data are also manually entered into program guide database 402 through data entry station 412. Data entry station 412 allows an operator to enter additional scheduling information, as well as combining and organizing data supplied by the scheduling companies. As with the computer organized data, the manually entered data are converted by the compiler into separate objects and sent to one or more of sub-databases 406.

The program guide objects are temporarily stored in sub-databases 406 until cyclers 408 request the information. Each of cyclers 408 preferably transmits objects at a different rate than the other cyclers 408. For example, cycler 408A may transmit objects every second, while cyclers 408B and 408C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 408 with a high rate of transmission, while program guide objects for later programs are sent to cyclers 408 with a lower rate of transmission. One or more of the data outputs 414 of cyclers 408 are forwarded to the packetizer of a particular transponder.

It is noted that the uplink configuration depicted in the prior figures and the program guide subsystem depicted in FIG. 4 can be implemented by one or more hardware modules, one or more software modules defining instructions performed by a processor, or a combination of both.

Broadcast Data Stream Format and Protocol

FIG. 5A is a diagram of a representative data stream. The first packet segment 502 comprises information from video channel 1 (data coming from, for example, the video sources 300A). The next packet segment 504 comprises computer data information that was obtained, for example from a computer data source. The next packet segment 506 comprises information from video channel 5 (from one of the video program sources 300A). The next packet segment 508 comprises program guide information such as the information provided by the program guide subsystem 306. As shown in FIG. 5A, null packets 510 created by a null packet module may be inserted into the data stream as desired.

The data stream therefore comprises a series of packets from any one of the data sources in an order determined by a controller. The data stream is encrypted by an encryption module 318, modulated by the modulator 320 (typically using a QPSK modulation scheme), and provided to a transmitter 322, that broadcasts the modulated data stream on a frequency bandwidth to the satellite via the antenna 106. The receiver/STB 210 receives these signals, and using the SCID, reassembles the packets to regenerate the program material for each of the channels.

FIG. 5B is a diagram showing one embodiment of a data packet for one transport protocol that can be used with embodiments of the present invention. Each data packet (e.g. 502-516) is 147 bytes long, and comprises a number of packet segments. The first packet segment 520 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 522 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 524 comprises 127 bytes of payload data, which is a portion of the video program provided by the video sources 200 or other audio or data sources. The final packet segment 526 is data required to perform forward error correction.

Embodiments of the present invention may also be implemented using MPEG transport protocols. FIG. 5C is a diagram showing another embodiment of a data packet for the MPEG-2 protocol. Each data packet comprises a sync byte 550, three transport flags 552, and a packet identifier (PID) 554. The sync byte 550 is used for packet synchronization. The transport flags include a transport error indicator flat (set if errors cannot be corrected in the data stream), a payload unit start indicator (indicting the start of PES data or PSI data, and a transport priority flag). The PID 554 is analogous to the SCID discussed above in that it identifies a data channel. A demultiplexer in the transport chip discussed below extracts elementary streams from the transport stream in part by looking for packets identified by the same PID. The scramble control flag 556 indicates how the payload is scrambled, the adaptation field flag 558 indicates the presence of an adaptation field 562, and the payload flag 560 indicates that the packet includes payload 564. The final packet segment 566 is data required to perform forward error correction.

Set Top Box

Figure 6:
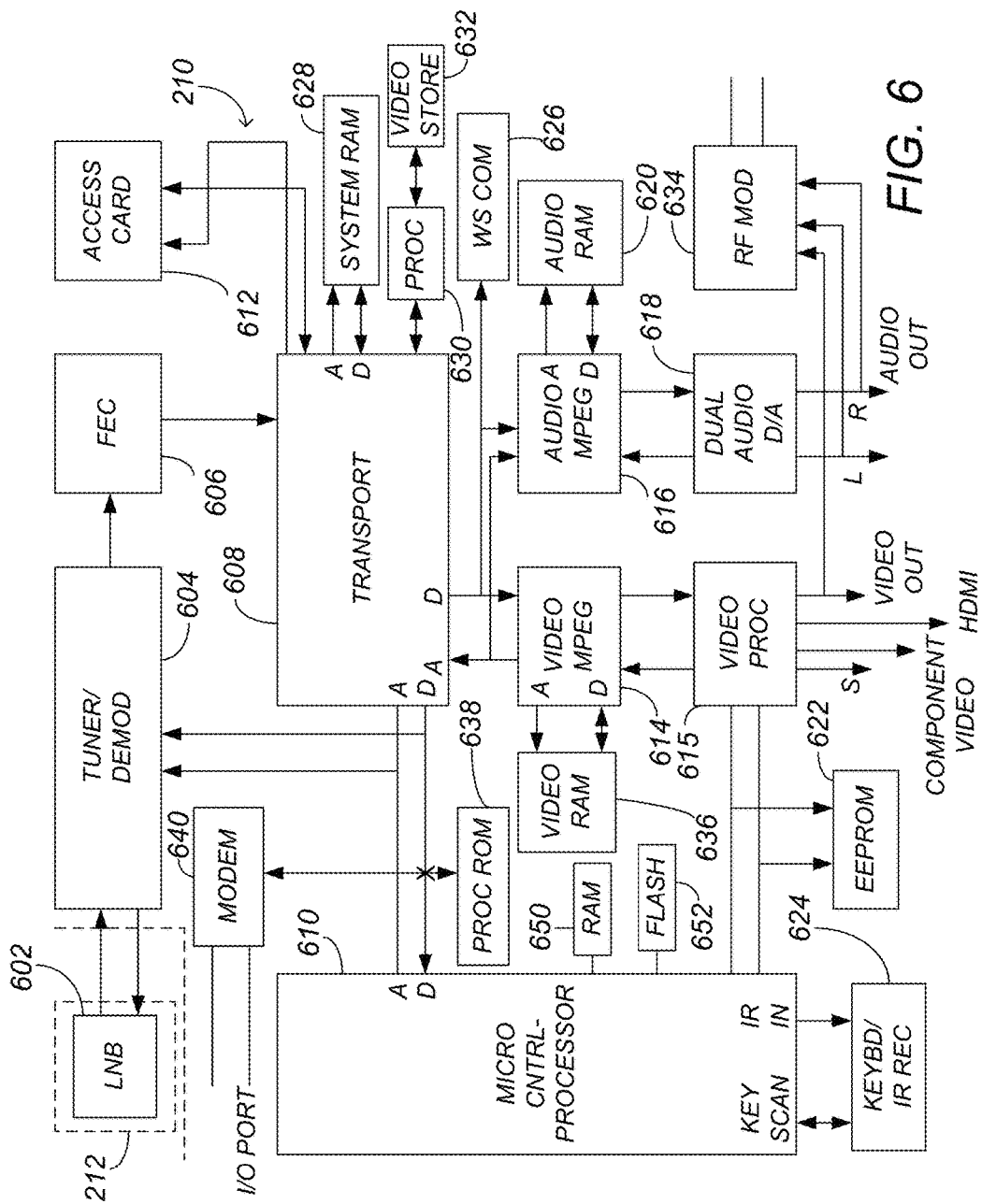
FIG. 6 is a block diagram of a set top box (STB) in accordance with one or more embodiments of the invention.

FIG. 6 is a block diagram of a set top box (STB) 210 (also hereinafter alternatively referred to as receiver or integrated receiver/decoder, or IRD). The set top box 210 is part of the receiver station and may comprise a tuner/demodulator 604 communicatively coupled to an ODU 112 having one or more LNBs 602. The LNB 602 converts the 12.2 to 12.7 GHz downlink signal 118 from the satellites 108 to, e.g., a 950-1450 MHz signal required by the set top box's 210 tuner/demodulator 604. The LNB 602 may provide either a dual or a single output. The single-output LNB 602 has only one RF connector, while the dual output LNB 602 has two RF output connectors and can be used to feed a second tuner 604, a second set top box 210 or some other form of distribution system.

The tuner/demodulator 604 isolates a single, digitally modulated transponder, and converts the modulated data to a digital data stream. As packets are received, the tuner/demodulator 604 identifies the type of each packet. If tuner/demodulator 604 identifies a packet as program guide data, tuner/demodulator 604 outputs the packet to memory. The digital data stream is then supplied to a forward error correction (FEC) decoder 606. This allows the set top box 210 to reassemble the data transmitted by the uplink center 104 (which applied the forward error correction to the desired signal before transmission to the subscriber receiving station 210) verifying that the correct data signal was received and correcting errors, if any. The error-corrected data may be fed from the FEC decoder module 606 to the transport module 608 via an 8-bit parallel interface.

The transport module 608 performs many of the data processing functions performed by the set top box 210 (e.g., using system random access memory 628). The transport module 608 processes data received from the FEC decoder module 606 and provides the processed data to the video MPEG decoder 614, the audio MPEG decoder 616, and the microcontroller 610 and/or data storage processor 630 for further data manipulation. In one embodiment of the present invention, the transport module 608, video MPEG decoder 614 and audio MPEG decoder 616 are all implemented on integrated circuits. This design promotes both space and power efficiency, and increases the security of the functions performed within the transport module 608. The transport module 608 also provides a passage for communications between the microprocessor 610 and the video and audio MPEG decoders 614, 616. As set forth more fully hereinafter, the transport module 608 also works with the conditional access module (CAM) 612 to determine whether the subscriber receiving station 210 is permitted to access certain program material. Data from the transport module 608 can also be supplied to external communication module 626.

The CAM 612 functions in association with other elements to decode an encrypted signal from the transport module 608. The CAM 612 may also be used for tracking and billing these services. In one embodiment of the present invention, the CAM 612 is a smart card, having contacts cooperatively interacting with contacts in the set top box 600 to pass information. In order to implement the processing performed in the CAM 612, the set top box 210, and specifically the transport module 608 provides a clock signal to the CAM 612.

Video data is processed by the MPEG video decoder 614. Using the video random access memory (RAM) 636, the MPEG video decoder 614 decodes the compressed video data and sends it to an encoder or video processor 615, which converts the digital video information received from the video MPEG module 614 into an output signal usable by a display or other output device. By way of example, processor 615 may comprise a National TV Standards Committee (NTSC) or Advanced Television Systems Committee (ATSC) encoder. In one embodiment of the invention both S-Video, baseband video and RF modulated video (NTSC or ATSC) signals are provided. Other outputs may also be utilized, and are advantageous if high definition programming is processed. Such outputs may include, for example, component video and the high definition multimedia interface (HDMI).

Using the audio RAM 620, audio data is likewise decoded by the MPEG audio decoder 616. The decoded audio data may then be sent to a digital to analog (D/A) converter 618. In one embodiment of the present invention, the D/A converter 618 is a dual D/A converter, one for the right and left channels. If desired, additional channels can be added for use in surround sound processing or secondary audio programs (SAPs). In one embodiment of the invention, the dual D/A converter 618 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 610 receives and processes command signals from the remote control 624, a set top box 210 keyboard interface, modem 640, and transport 608. The microcontroller 610 receives commands for performing its operations from a processor programming memory, which permanently stores such instructions for performing such commands. The memory used to store data for microprocessor 610 and/or transport 608 operations may comprise a read only memory (ROM) 638, an electrically erasable programmable read only memory (EEPROM) 622, a flash memory 652 and/or a random access memory 650, and/or similar memory devices. The microprocessor 610 also controls the other digital devices of the set top box 210 via address and data lines (denoted "A" and "D" respectively, in FIG. 6).

As used herein, the remote control 624 may be a touch screen device such as a smartphone, a tablet computer, a personal digital assistant, etc. Such a remote control 624 may provide the ability to control the playback via the UI component described herein (on a display device [e.g., a television monitor]) of video content stored within or transmitted via STB 210. Alternatively, remote control 624 may function as the display device itself, and video content may be directly received in remote control 624 via STB 210, or may be received via a modem or other receiving means within remote control 624 (e.g., an antenna or other means to receive broadcast content, a Wi-Fi adapter, via USB connected to a computer or other device, etc.) such that the remote control 624 may receive content via the Internet 220, a local or wide area network, or other transmissions medium and may display the UI component as described herein.

The modem 640 connects to the customer's phone line via the PSTN port. Alternatively, the modem 640 may comprise an Ethernet connection or wireless adapter to connect to the customer's network and related Internet connection. The set top box 210 communicates with (e.g., via the modem 640) the head end 104, e.g. the program provider, and transmits the customer's purchase information for billing purposes, and/or other information. The modem 640 is controlled by the microprocessor 610. The modem 640 can output data to other I/O port types including standard parallel and serial computer I/O ports. Data can also be obtained from a cable or digital subscriber line (DSL) modem, or any other suitable source. Further, the modem 640 may be utilized to maintain the persistent connection with the head end 104 as described above.

The set top box 210 may also comprise a local storage unit such as the storage device 632 for storing video and/or audio and/or other data obtained from the transport module 608. Video storage device 632 can be a hard disk drive, a read/writeable compact disc of DVD, a solid state RAM, or any other storage medium. In one embodiment of the present invention, the video storage device 632 is a hard disk drive with specialized parallel read/write capability so that data may be read from the video storage device 632 and written to the device 632 at the same time. To accomplish this feat, additional buffer memory accessible by the video storage 632 or its controller may be used. Optionally, a video storage processor 630 can be used to manage the storage and retrieval of the video, audio, and/or other data from the storage device 632. The video storage processor 630 may also comprise memory for buffering data passing into and out of the video storage device 632. Alternatively or in combination with the foregoing, a plurality of video storage devices 632 can be used. Also alternatively or in combination with the foregoing, the microprocessor 610 can also perform the operations required to store and or retrieve video and other data in the video storage device 632.

The video processing module 615 output can be directly supplied as a video output to a viewing device such as a video or computer monitor. In addition the video and/or audio outputs can be supplied to an RF modulator 634 to produce an RF output and/or 8 vestigial side band (VSB) suitable as an input signal to a conventional television tuner. This allows the set top box 600 to operate with televisions without a video input.

Each of the satellites 108 comprises one or more transponders, each of which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective SCIDs.

Preferably, the set top box 210 also receives and stores a program guide in a memory available to the microprocessor 610. Typically, the program guide is received in one or more data packets in the data stream from the satellite 108. The program guide can be accessed and searched by the execution of suitable operation steps implemented by the microcontroller 610 and stored in the processor ROM 638. The program guide may include data to map viewer channel numbers to satellite networks, satellite transponders and SCIDs, and also provide TV program listing information to the subscriber 122 identifying program events.

Initially, as data enters the set top box 210, the tuner/demodulator 604 looks for a boot object. Boot objects are always transmitted with the same SCID number, so tuner 604 knows that it must look for packets marked with that identification number. A boot object identifies the identification numbers where all other objects can be found. Further, such boot objects may initiate the persistent connection methods described above.

As data is received and stored in the memory, the microprocessor 610 acts as a control device and performs various operations on the data in preparation for processing the received data. These operations include packet assembly, object assembly and object processing.

The first operation performed on data objects stored in the memory 650 is packet assembly. During the packet assembly operation, microprocessor 610 examines the stored data and determines the locations of the packet boundaries.

The next step performed by microprocessor 610 is object assembly. During the object assembly step, microprocessor 610 combines packets to create object frames, and then combines the object frames to create objects. Microprocessor 610 examines the checksum transmitted within each object frame, and verifies whether the frame data was accurately received. If the object frame was not accurately received, it is discarded from memory 650. Also during the object assembly step, the microprocessor 610 discards assembled objects that are of an object type that the microprocessor 610 does not recognize. The set top box 210 maintains a list of known object types in memory 650. The microprocessor 610 examines the object header of each received object to determine the object type, and the microprocessor 610 compares the object type of each received object to the list of known object types stored in memory 650. If the object type of an object is not found in the list of known object types, the object is discarded from memory 650. Similarly, the set top box 210 maintains a list of known descriptor types in memory 650, and discards any received descriptors that are of a type not in the list of known descriptor types.

The last step performed by microprocessor 610 on received object data is object processing. During object processing, the objects stored in the memory 650 are combined to create a digital image. Instructions within the objects direct microprocessor 610 to incorporate other objects or create accessible user-links. Some or all of the digital images can be later converted to an analog signal that is sent by the set top box 210 to a television or other display device for display to a user.

The functionality implemented in the set top box 600 depicted in FIG. 6 can be implemented by one or more hardware modules, one or more software modules defining instructions performed by a processor, or a combination of both.

Computer Hardware/Software

Figure 7:
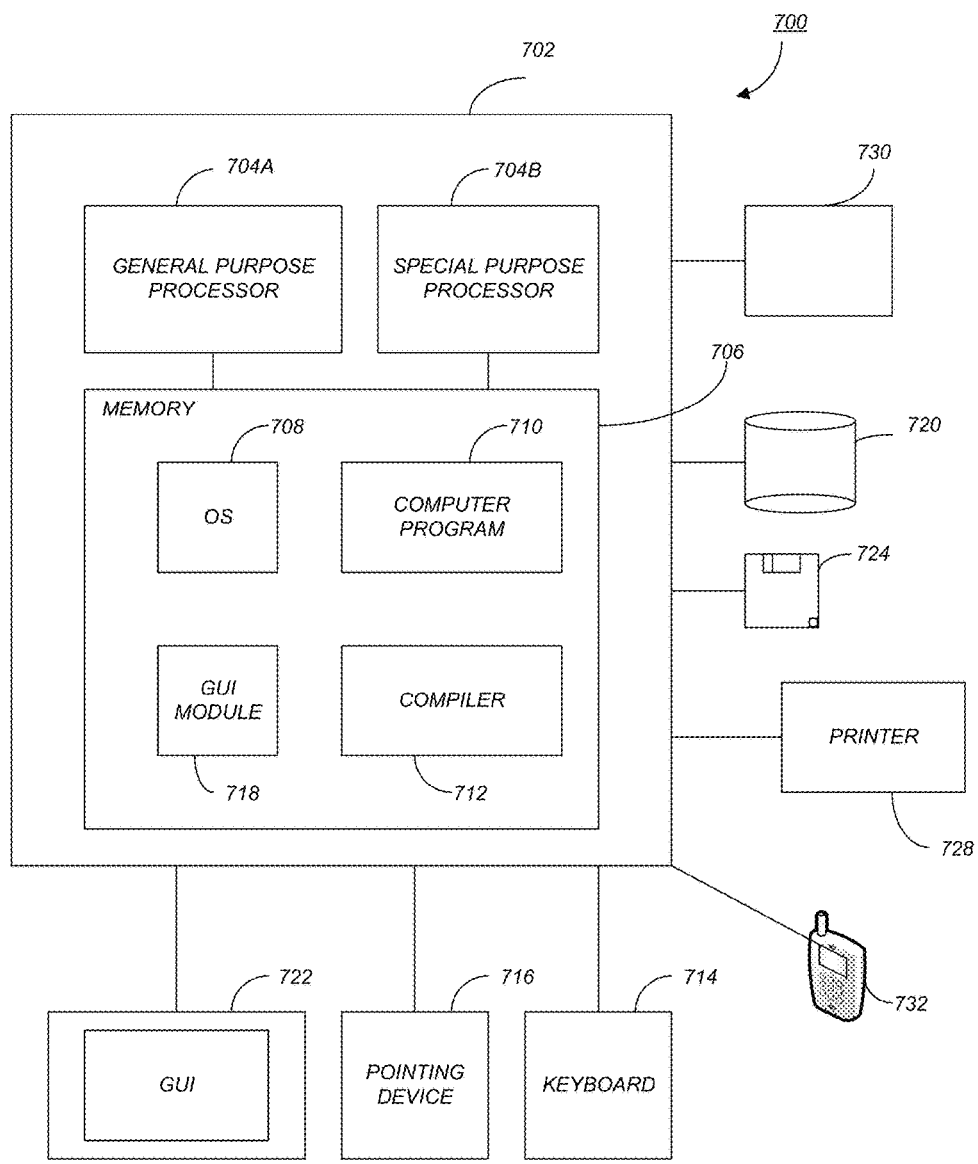
FIG. 7 is an exemplary hardware and software environment used to implement one or more embodiments of the invention.

FIG. 7 is an exemplary hardware and software environment 700 used to implement one or more embodiments of the invention. The hardware and software environment includes a computer 702 and may include peripherals. Computer 702 may be a user/client computer, server computer, or may be a database computer. The computer 702 comprises a general purpose hardware processor 704A and/or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening or remote control device 732 (e.g., an MP3 player, iPod™, Nook™, portable digital video player, cellular device, personal digital assistant, remote control, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the general purpose processor 704A performing instructions defined by the computer program 710 under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a UI module 718. Although the UI module 718 is depicted as a separate module, the instructions performing the UI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™ etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, the some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as COBOL, Pascal, C++, FORTRAN, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as Java™ Perl™, Basic™, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
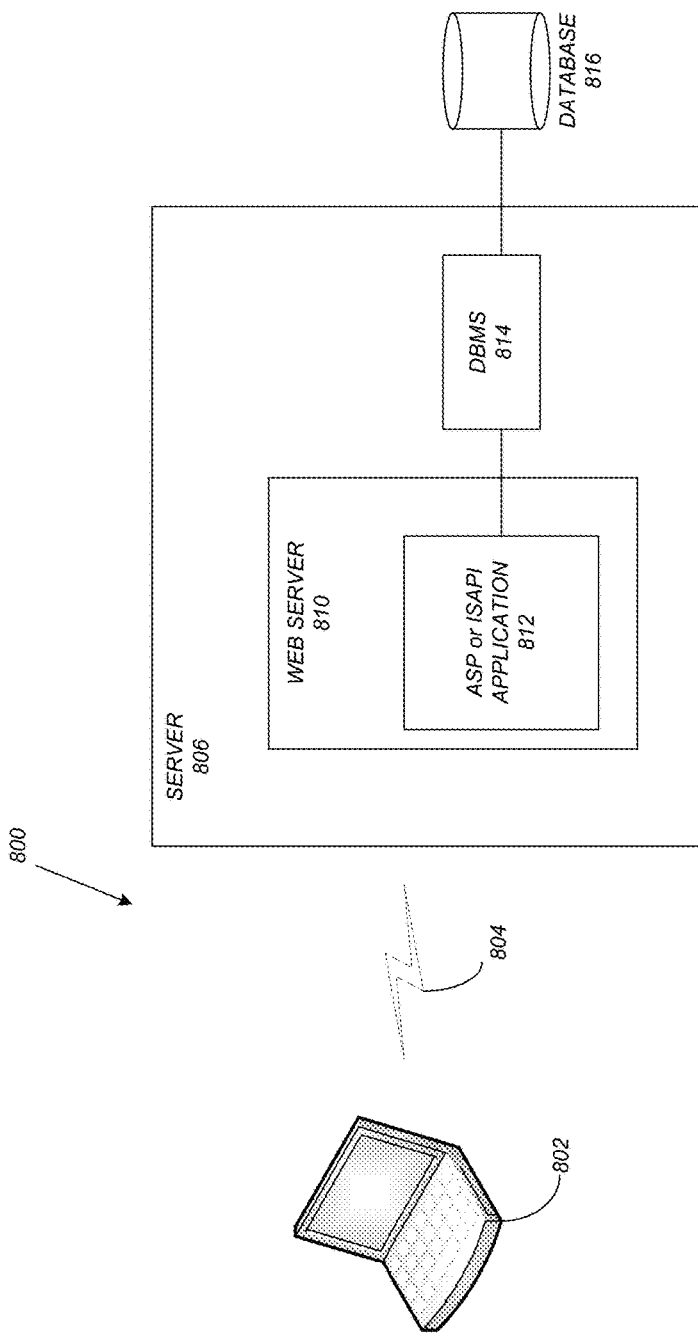
FIG. 8 schematically illustrates a typical distributed computer system using a network to connect client computers to server computers in accordance with one or more embodiments of the invention.

FIG. 8 schematically illustrates a typical distributed computer system 800 using a network 804 to connect client computers 802 to server computers 806. A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize Ethernet, coaxial cable, wireless communications, radio frequency (RF), etc. to connect and provide the communication between clients 802 and servers 806. Clients 802 may execute a client application or web browser and communicate with server computers 806 executing web servers 810. Such a web browser is typically a program such as MICROSOFT INTERNET EXPLORER™ MOZILLA FIREFOX™, OPERA™, APPLE SAFARI™, GOOGLE CHROME™, etc. Further, the software executing on clients 802 may be downloaded from server computer 806 to client computers 802 and installed as a plug-in or ACTIVEX™ control of a web browser. Accordingly, clients 802 may utilize ACTIVEX™ components/component object model (COM) or distributed COM (DCOM) components to provide a UI on a display of client 802. The web server 810 is typically a program such as MICROSOFT'S INTERNET INFORMATION SERVER™.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 may be part of, or connected directly to, client 802 instead of communicating/obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S™ Transaction Server (MTS) to access required data stored in database 816 via an interface such as ADO (Active Data Objects), OLE DB (Object Linking and Embedding DataBase), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability. Embodiments of the invention are implemented as a software application on a client 802 or server computer 806. Further, as described above, the client 802 or server computer 806 may comprise a thin client device or a portable device that has a multi-touch-based display.

Of course, those skilled in the art will recognize that any combination of the above components, or any number of different components, peripherals, and other devices, may be used with computers 802 and 806.

Media Content Player Control Interface

Interface Control and Interaction

As described above, embodiments of the invention may be implemented via and integrated with a variety of different environments including a satellite television broadcast environment, and/or via the Internet (e.g., via a computer). The different environments have a common attribute/capability—that of providing a UI that may be used to control the play of media content (e.g., video). Such hardware/software environments may be provided via a touchscreen computer (e.g., a tablet device such as an iPad™), a smartphone (e.g., an Apple™ based phone, an Android™ based phone, or other operating system based phone), a remote control having a display/touchscreen, etc. Alternatively or in addition, the control interface may be displayed on a touchscreen or non-touch based display where interaction with the control interface may be conducted via a remote control, mouse, stylus, finger gestures, 3D/stereoscopic control devices (e.g., 3D interactive gloves or any other type of virtual interactive devices), etc.

Further to the above, embodiments of the invention may be incorporated into any touchscreen (or non-touchscreen) based device media content/video player application. Additionally, embodiments of the invention may be incorporated into any (touchscreen) remote control application.

Embodiments of the invention provide a UI component that is specifically used for controlling and navigating video playback on a touchscreen device. The component has a circular layout and provides UI elements for playing, pausing, fast forwarding, rewinding, displaying of thumbnail snapshots of scenes while rewinding and fast forwarding, volume control, closed captioning, toggling full screen video playback, bookmarking of particular frames of media content for later retrieval and use as well as a feature that prevents the bypassing of advertisement insertions during video playback. The circular layout provides a superior user experience to the traditional linear layout since it conforms to the more natural and intuitive circular gestures made by a user's thumb.

Figure 9:
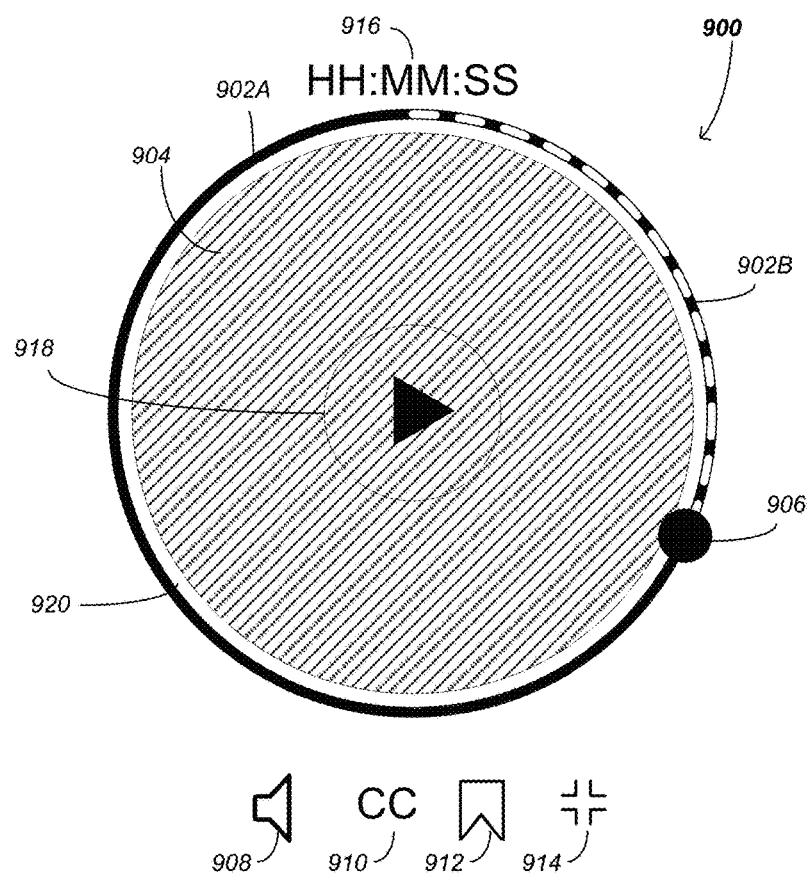
FIG. 9 illustrates an enlarged view of the circular UI component in accordance with one or more embodiments of the invention.

FIG. 9 illustrates an enlarged view of the circular UI component in accordance with one or more embodiments of the invention. The circular UI component 900 consists of a circular progress bar 902, a circular keyframe 904, a progress marker 906, icons 908-914, and an elapsed time indicator 916.

The circular progress bar (CPB) is comprised of two parts: the full circle reference 902A, and the overlapped partial circle 902B (collectively referred to as CPB 902). The overlapped partial circle 902B may be displayed in a contrasting color/pattern and indicates the percentage of the video/media content that has been played. The CPB 902 is drawn continuously during the time the video is being played. Every second, the video player object sends a notification to inform the CPB 902 to redraw both its parts.

The full circle reference 902A is drawn as a circle (360 degrees) with a predefined radius. The overlapped partial circle 902B, indicating the percentage of the video played is drawn by calculating the current time of the program being played, and the duration of the program to produce the updated angle of the current moment of the program. The angle calculation may be performed based on:

angle=360 degrees−(currentTime/duration)*360)

The overlapped partial circle 902B is drawn from 0 degrees to angle degrees.

A keyframe is a sprite image that is loaded before the video program is played. Keyframes are used to provide users a preview of the upcoming frames in a video program/media content. Standard keyframes are rectangular images. To fit the keyframes inside the CPB 902, the keyframe 904 is placed in the middle of the CPB 902, and a circular mask is applied so that the user sees a circular keyframe 904 inside the CPB 902. In FIG. 9, the keyframe 904 is illustrated in a hatch pattern but when used with/overlaid onto a media clip/video player, would be filled with an actual keyframe of the video content.

The progress marker 906 is a circular knob that indicates the current position in time of the media content. The progress marker 906 is positioned at 0 degrees at the initialization of the media content. As the media content is viewed, the progress marker 906 is updated accordingly and is positioned at angle degrees. The user may interact with the progress marker 906 to rewind and fast forward the video program. The progress marker 906 is drawn every time the CPB 902 is drawn.

The icons displayed beneath CPB 902 include a volume icon 908 (to activate volume control capability), a closed caption icon 910 (to toggle on and off closed captioning of the media content), a bookmark icon 912 (to bookmark desired media content frames or moments in time), and a full screen icon 914 (to expand/contract the media content to occupy the full viewing area of the display device/screen). In addition, the current elapsed time 916 of the media content (synchronized with the current position of the progress marker 906) may be displayed in hours, minutes, and seconds (HH:MM:SS) above CPB 902.

FIG. 9 also illustrates pause/play icon 918 that is centrally displayed within CPB 902. In FIG. 9, the media content/video has been paused thereby causing icon 918 to display. The user may simply tap/touch icon 918 (or anywhere on the display device) to begin playback of the media content.

Of note is that the circular UI component may be activated for display during playback by the user tapping/touching the display device and/or a particular location on the display device (e.g., with a finger, stylus, cursor, etc.). Such a touch event may activate the circular UI component 900 for user interaction. If the user does not interact with the circular UI component 900 after a defined period of time (e.g., 5 seconds), the component 900 may fade out and/or will no longer be displayed. The area in between the CPB 902 and the keyframe 904 (i.e., area 920) may be transparent such that the media content/video that is being watched can be seen through area 920.

The keyframe 904 that is displayed within CPB 902 may vary. For example, if the progress marker 906 is synchronized with the current media content location, the keyframe 904 may match the frame that is displayed in the media content player. Alternatively, if the user has elected to scrub forward or back (e.g., using progress marker 906), the keyframe 904 that is displayed within CPB 902 may reflect the location of the progress marker 906. In other words, as the user is scrubbing the media content forward or backward (e.g., by moving/sliding the progress marker 906 around CPB 902), different keyframes 904 are displayed that reflect the location of the progress marker 906. In one or more embodiments, such keyframes may comprise an I-frame (intra coded frame/slice). However, other frames (e.g., B-frames or P-frames) may also be displayed.

Figure 10:
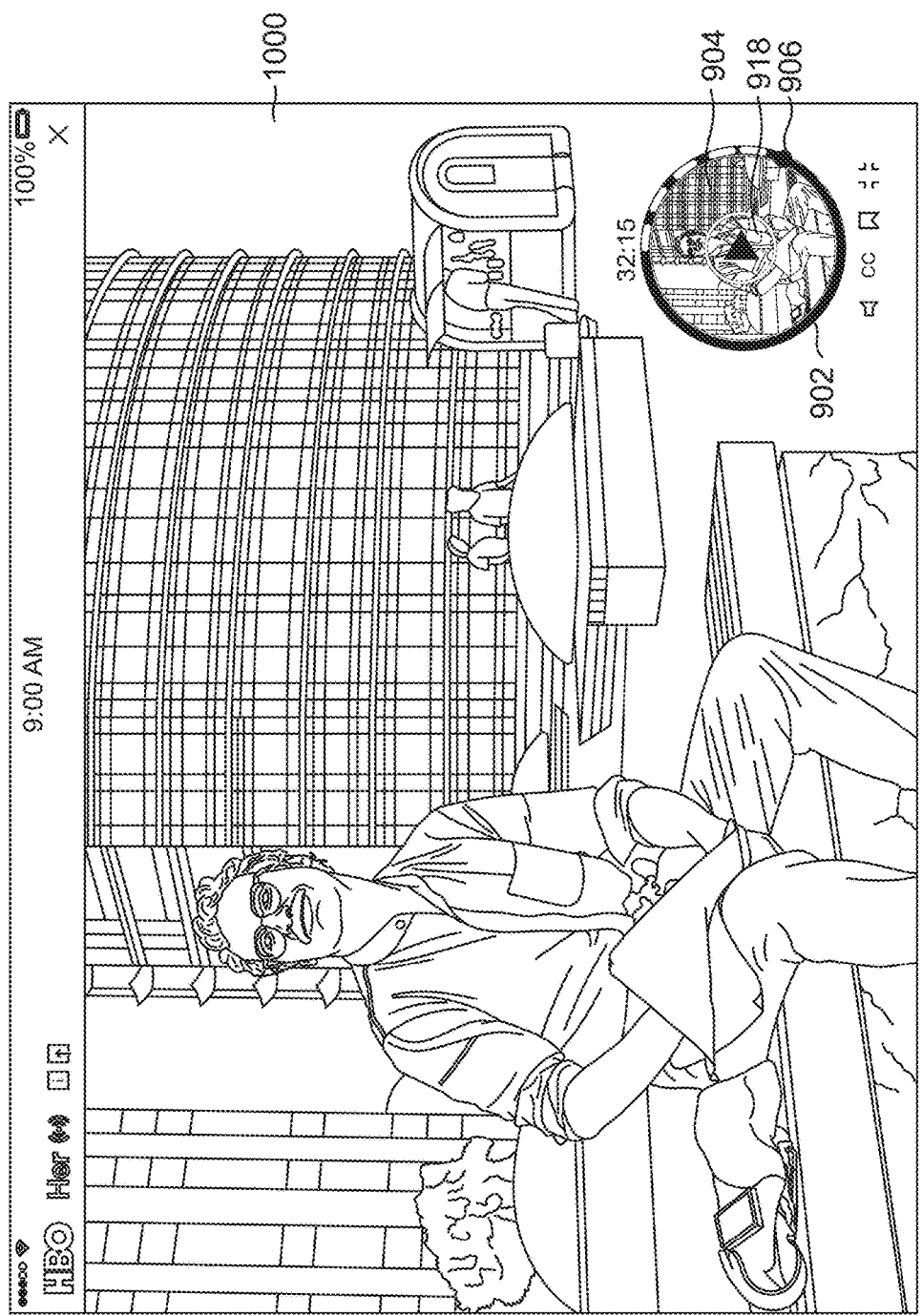
FIG. 10 illustrates an exemplary view of the UI component that has been activated when playing back media content (e.g., the movie "Her") in accordance with one or more embodiments of the invention.

FIG. 10 illustrates an exemplary view of the UI component 900 that has been activated when playing back media content (e.g., the movie "Her") in accordance with one or more embodiments of the invention. As illustrated, the user has paused playback at the location of the progress marker 906 and the keyframe 904 is synchronized with the frame 1000 displayed in the video player. The user can select a different location within the media content simply by moving/sliding progress marker 906 along CPB 902. While any finger digit may be utilized, the UI component 900 may be placed at a location of a touchscreen device (e.g., adjacent the edge or lower right corner) to facilitate movement with the user's thumb. In this regard, the user may still hold the touchscreen device with his/her right hand (and/or left hand) while moving the progress marker 906 along CPB 902 in a circular motion that is natural/intuitive and/or consistent with the user's thumb's natural rotational angle. Additionally, the user may continue the scrubbing gesture outside of CPB 902 (only after the scrubbing gesture has been initiated) to provide further granularity and ease of use. The further from CPB 902 the user scrubs, the more granular the scrubbing gesture will be. The user may also have the option of moving UI component 900 to one of various predefined locations (e.g., it may snap to a particular location such as upper right, upper left, lower left, or lower right), and/or to a user defined location (i.e., that has no limitations within the video player).

Figure 11:
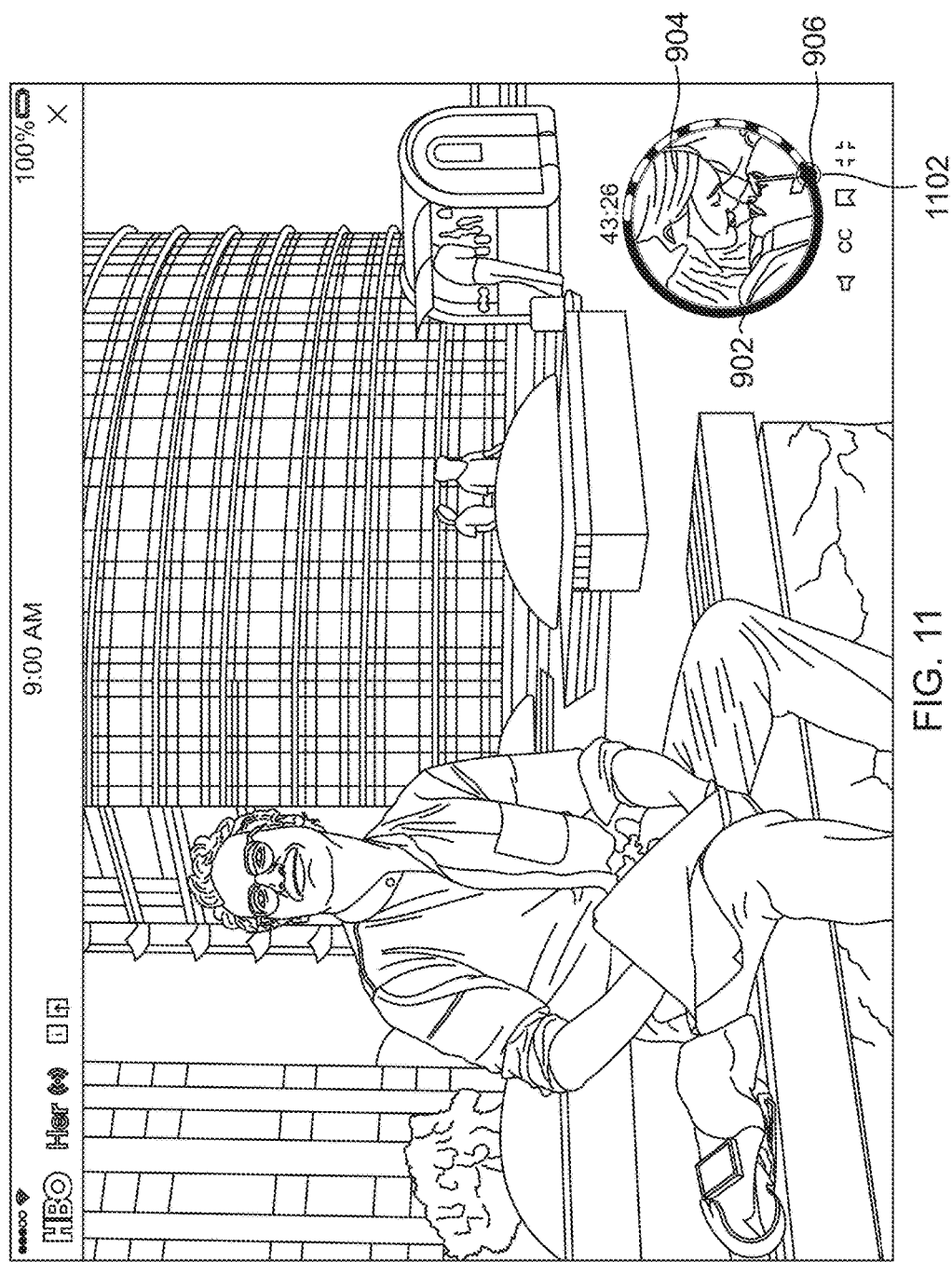
FIG. 11 illustrates an exemplary view of the UI component where the user has scrubbed to a new location using the UI component in accordance with one or more embodiments of the invention.

When the user has elected to begin a scrubbing gesture (e.g., to rewind or fast forward the media content), activation of such a scrubbing gesture may be visually indicated by the UI component 900. In one or more embodiments, such a visual indication consists of displaying a circle around progress marker 906. Once the user slides the progress marker 906 to a new location within CPB 902, the keyframe 904 is updated within CPB 902. FIG. 11 illustrates an exemplary view of the UI component where the user has scrubbed to a new location using UI component 900 in accordance with one or more embodiments of the invention. As illustrated, the keyframe associated with the location of progress marker 906 is displayed within CPB 902. Further, a circle 1102 is displayed around progress marker 906 thereby indicating an active scrub command is executing. Once the user releases the touch event (i.e., lifts his/her thumb off of the progress marker 906), the video player may automatically (i.e., without additional user input) advance/rewind to the scrubbed location and commence playback from such a location.

Figure 12:
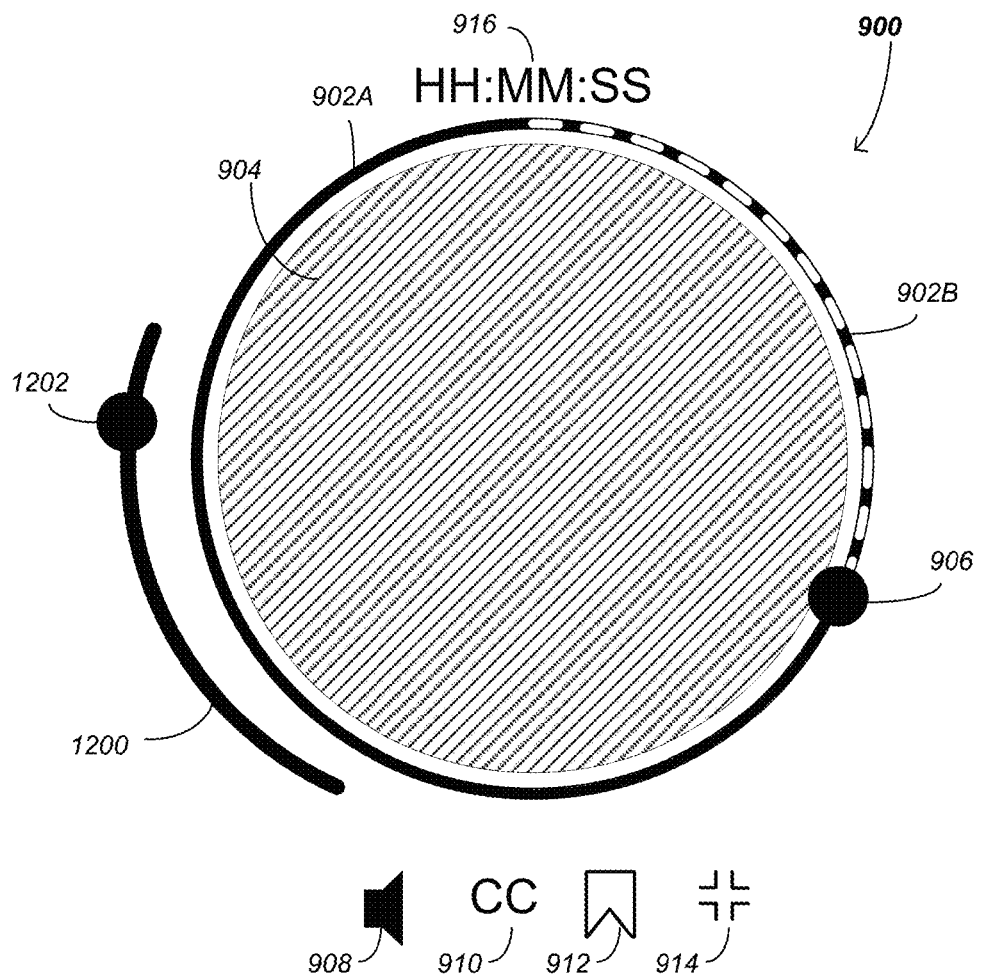
FIG. 12 illustrates the UI component where the volume control has been activated in accordance with one or more embodiments of the invention.

To activate the volume control, the user may touch and/or select icon 908. Activation of icon 908 is indicated by displaying icon 908 in a different color/pattern/etc. Once activated, a volume scrubber bar 1200 is displayed as in FIG. 12. Such a volume scrubber bar 1200 may be a solid color, may fade towards the ends, may have different colors, etc. A volume progress marker 1202 indicates the current volume level that has been selected. The user can simply slide/move the volume progress marker 1202 along volume scrubber bar 1200 to adjust the volume as desired. Similar to progress marker 906, volume progress marker 1202 may be moved using a thumb gesture in a circular pattern that is natural/intuitive and/or is consistent with the user's thumb's natural rotational angle.

Figure 13:
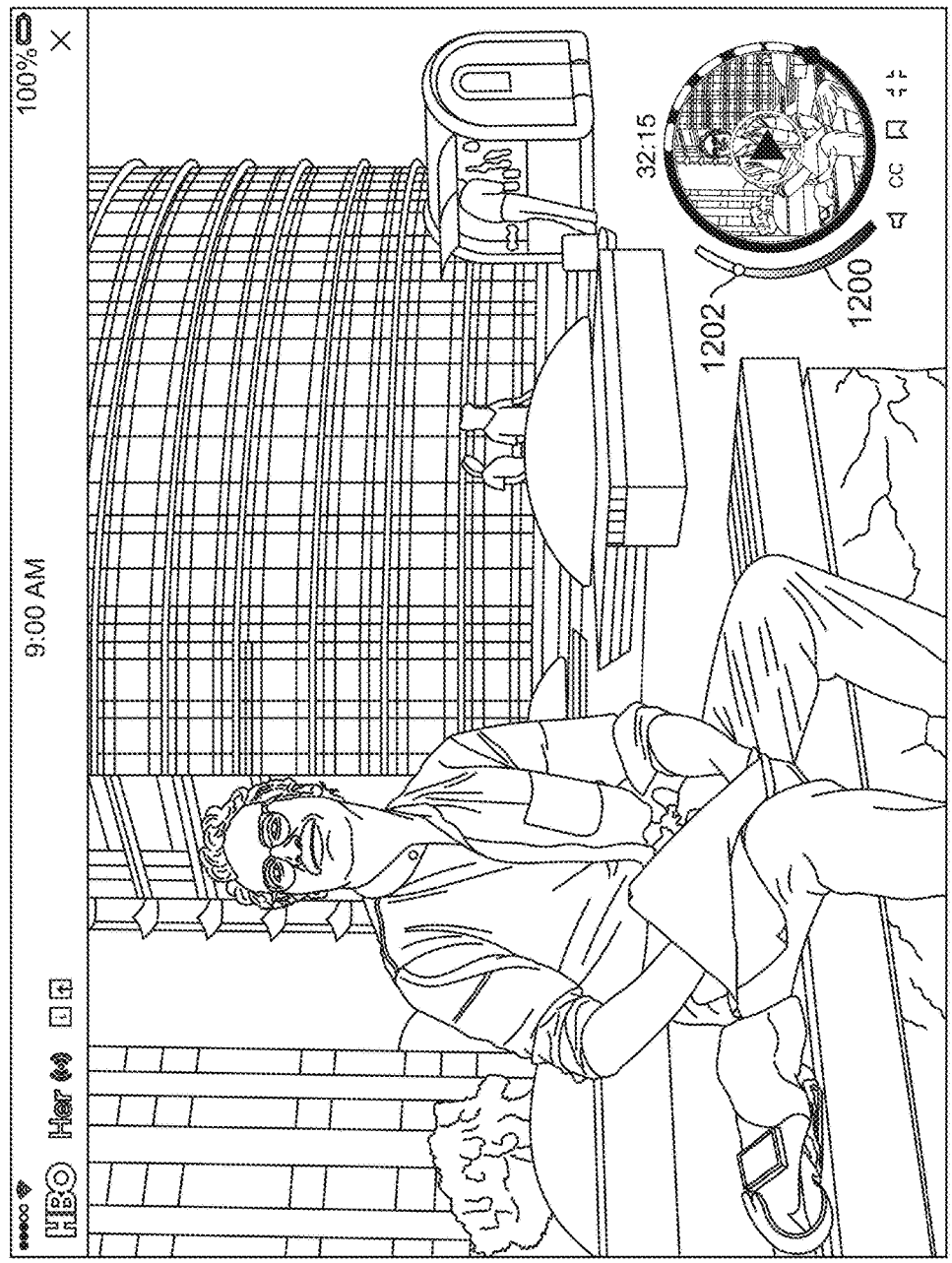
FIG. 13 illustrates an exemplary view of the UI component in which the volume control has been activated in accordance with one or more embodiments of the invention.

FIG. 13 illustrates an exemplary view of the UI component 900 in which the volume control has been activated in accordance with one or more embodiments of the invention.

Video Frame Bookmarking

Embodiments of the invention may further allow a user to bookmark desired frames in a video. The user has the option to bookmark the frame of the video that is displayed when the video is paused. If the frame displayed when the video is paused is already bookmarked, the user has the option to remove the bookmark. Such a bookmarking capability enhances the user experience by addressing a need users naturally have to record and recall significant moments in a video for either personal or social use. Further, such bookmarking has a wide range of uses and applications (e.g., within any touchscreen device video player application or any touchscreen device remote control application).

Figure 14:
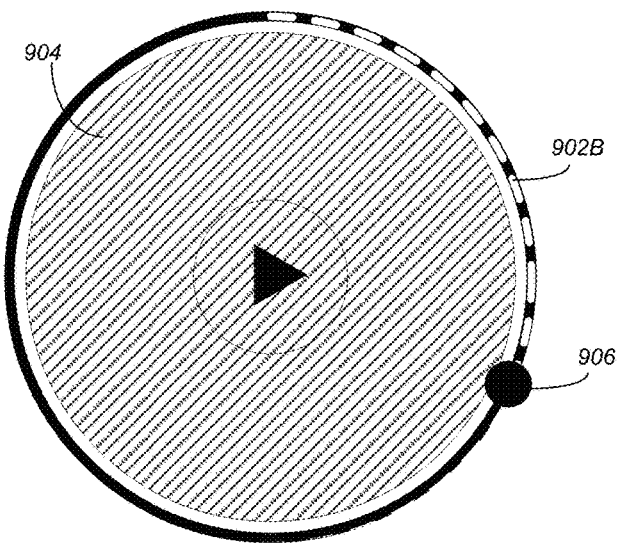
FIG. 14 illustrates an exemplary view of the UI component where playback has been paused and a bookmark has been set at the pause location in accordance with one or more embodiments of the invention.

FIG. 14 illustrates an exemplary view of the UI component 900 where playback has been paused and a bookmark has been set at the pause location in accordance with one or more embodiments of the invention. In particular, the user has touched/selected bookmark icon 912 (indicated in FIG. 14 with a change in the icon's color/fill pattern) when compared to bookmark icon 912 in FIG. 12.

Figure 15:
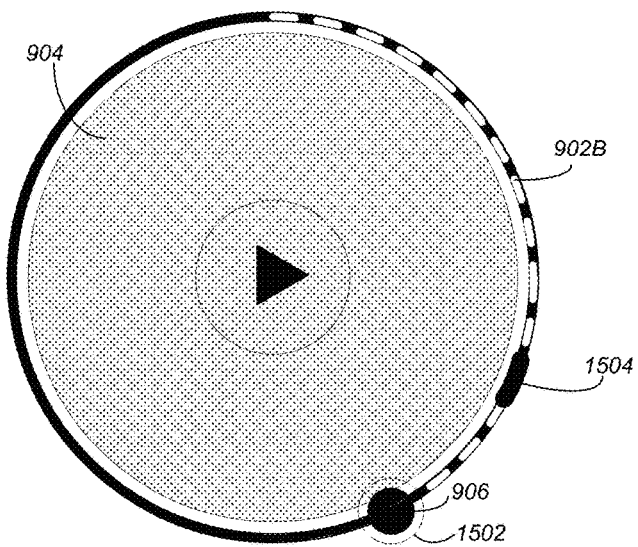
FIG. 15 illustrates an exemplary view of the UI component with a bookmark indicator displayed in accordance with one or more embodiments of the invention.

FIG. 15 illustrates an exemplary view of the UI component 900 with a bookmark indicator displayed in accordance with one or more embodiments of the invention. As illustrated, as the user scrubs forward or back, a circle 1502 is displayed around progress marker 906. Further, a bookmark indicator 1504 identifies the location of the frame that was bookmarked in FIG. 14. As described above, once the user has scrubbed to a new location within CPB 902, the keyframe 904 displayed inside of CPB 902 changes to reflect the location of the progress marker 906. Thereafter, whenever the progress marker 906 is placed over the bookmarked location 1504, the bookmark icon 912 may indicate the location (e.g., as illustrated in FIG. 14 by a contrasting color/fill). In one or more embodiments, as the progress marker 906 is moved within a defined threshold range of the bookmarked location 1504, the progress marker 906 may snap to the bookmarked location 1504 (thereby enabling easy and efficient navigation to the exact bookmarked location 1504).

Figure 16:
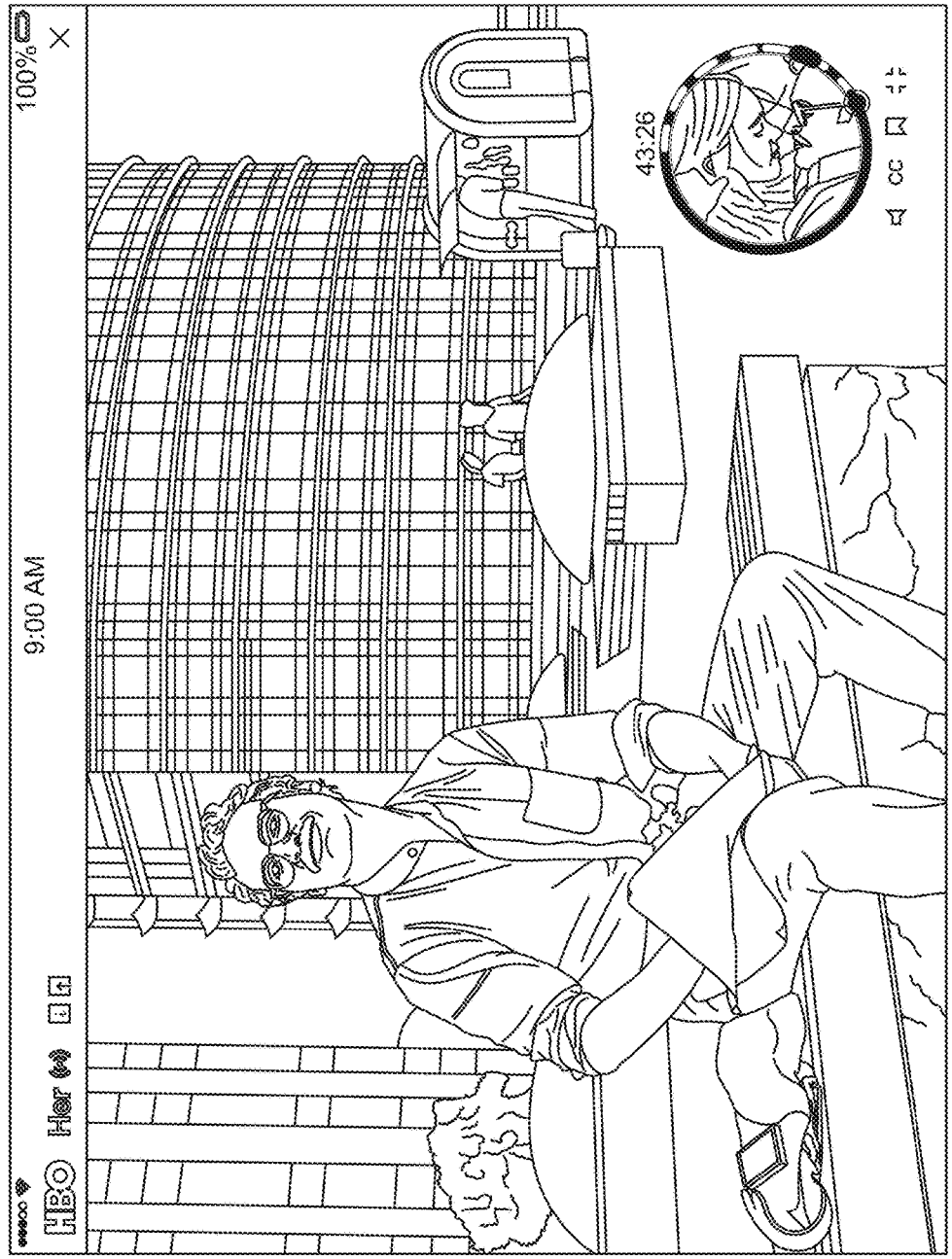
FIG. 16 illustrates a view of the UI component of FIG. 15 being utilized in a video player in accordance with one or more embodiments of the invention.

FIG. 16 illustrates a view of the UI component of FIG. 15 being utilized in a video player in accordance with one or more embodiments of the invention.

Advertising Bypass Prevention UI Component

Embodiments of the invention may also prevent a user from bypassing advertisement insertions during video playback. If there are advertisement insertions in the media content and a user begins to scrub, the keyframe 904 is displayed inside of CPB 902 as described above. When the user reaches the point where there is an advertisement insertion, a thumbnail of the advertisement instead of a frame of the media content is displayed in keyframe 904. When attempting to bypass an advertisement when viewing thumbnails 904 of media content while rewinding or fast-forwarding by scrubbing beyond it, the user is permitted to extend the progress marker 906 slightly beyond the advertisement before the progress marker 906 snaps back to the point of the advertisement, preventing the user from proceeding without watching the advertisement. This progress marker 906 "stickiness" will continue until the user has viewed the advertisement. Embodiments of the invention may also vibrate as a way to provide haptic feedback.

Based on such advertising bypass prevention, the user experience may be enhanced by transforming a typical nuisance (being required to watch an advertisement) into a playful interaction.

Figure 17A:
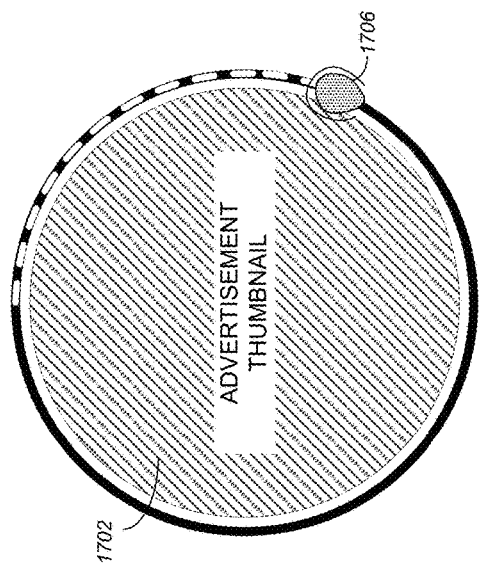
FIGS. 17A-17D illustrate the various states of a UI component where advertising bypass is prevented in accordance with one or more embodiments of the invention.
Figure 17B:
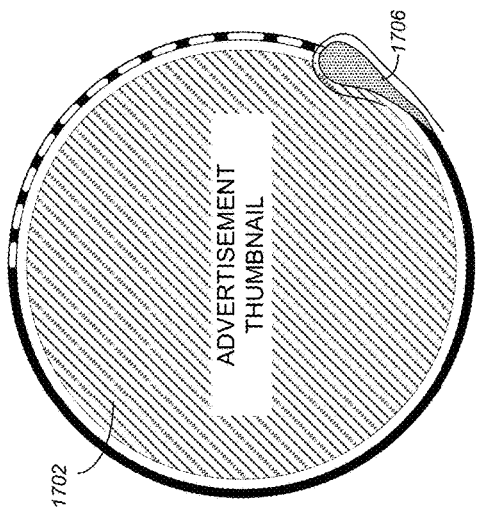
Figure 17C:
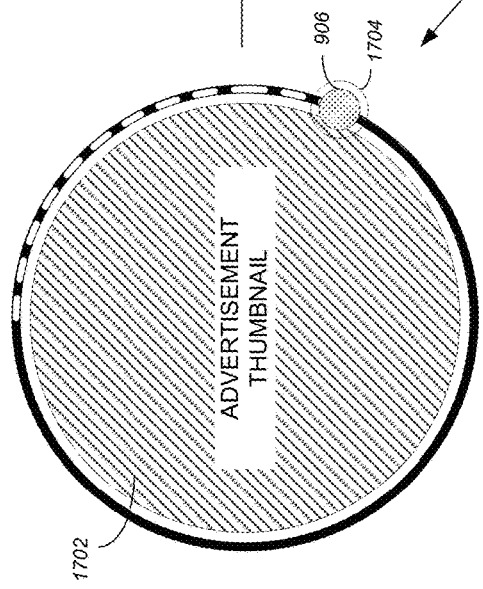
Figure 17D:
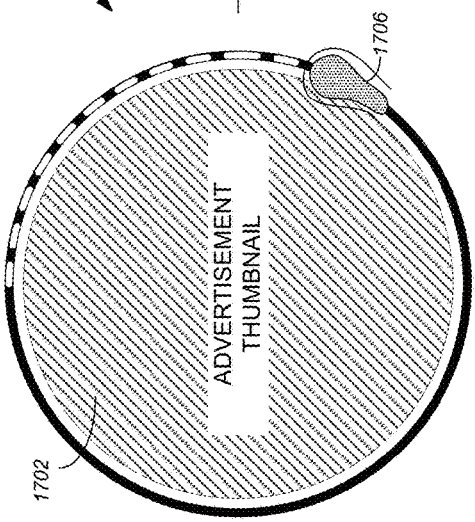

FIGS. 17A-17D illustrate the various states of a UI component where advertising bypass is prevented in accordance with one or more embodiments of the invention. When there is an advertisement, the advertisement thumbnail 1702 may be displayed within CPB 902. Embodiments of the invention do not permit the user to scrub ahead of the advertisement. As illustrated in FIG. 17A, the user has begun scrubbing, as indicated by the circle 1704 around progress marker 906. As the user scrubs forward (i.e., progressing from FIG. 17A to FIG. 17B to FIG. 17C to FIG. 17D), the round progress marker 906 and circular indicator 1704 morph into a rubbery blob 1706 as indicated in FIGS. 17B, 17C, and 17D. The rubbery blob 1706 can be stretched as illustrated in FIGS. 17B-17D but snaps back into the round indicator 906 (as illustrated in FIG. 17A) before the advertisement is played. Accordingly, the user is not permitted to scrub past the advertisement.

Logical Flow

Figure 18:
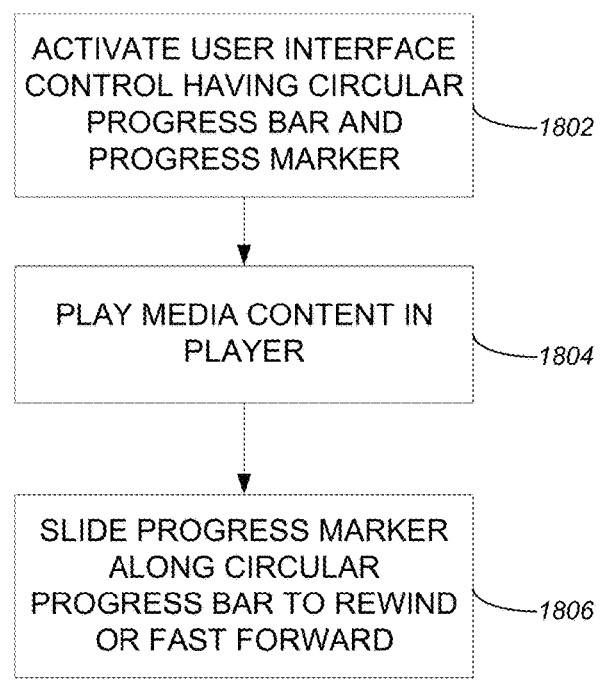
FIG. 18 illustrates the logical flow for controlling media content play in accordance with one or more embodiments of the invention.

FIG. 18 illustrates the logical flow for controlling media content play in accordance with one or more embodiments of the invention.

At step 1802, a UI component that controls playback of the media content in a media player is activated (e.g., within the media player on a touchscreen device or on a touchscreen device remote control that controls the media player). The UI component includes a circular progress bar and a progress marker that coincides with the circular progress bar.

At step 1804, the media content is played in the media player. As the media content is playing, the progress marker moves around the circular progress bar reflecting the real time progress of the media content being played. Further, the circular progress bar may be continuously drawn during the time the media content is being played. In addition, the circular progress bar may include a full circle reference that is drawn as a circle with a predefined radius, and an overlapped partial circle indicating a percentage of the media content played. The partial circle may be drawn from zero (0) degrees to an "angle" degrees that is based on a calculation of 360 degrees−((current time/duration)*360), wherein the "current time" is the current time of the media content being played and the "duration" is the total duration of the media content. The circular progress bar may also include a scaled circular keyframe (displayed within the circular progress bar) that includes a preview of a frame of the media content located at a time within the media content that is identified by the progress marker. In this regard, the scaled keyframe is a scaled version of a particular frame of the media content. To display the scaled circular keyframe, a scaled rectangular keyframe may be displayed in the middle of the circular progress bar, and a circular mask may then be applied.

At step 1806, based on user input, the progress marker moves along the circular progress bar to rewind or fast forward the media content.

Figure 19:
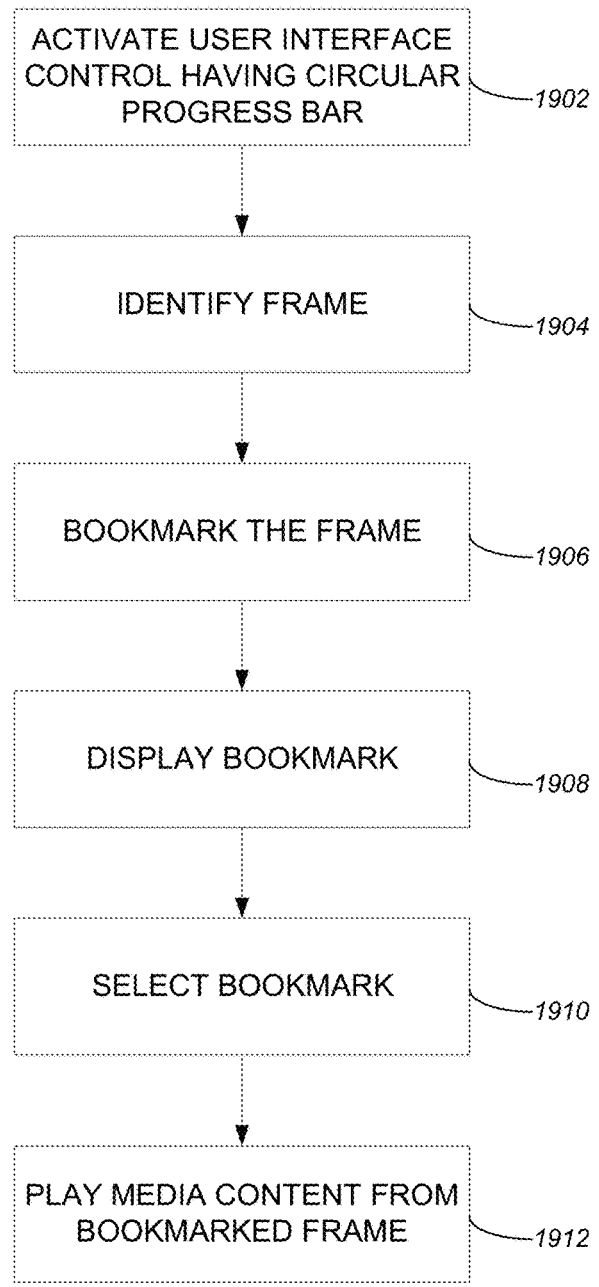
FIG. 19 illustrates the logical flow for bookmarking a frame of media content in accordance with one or more embodiments of the invention.

FIG. 19 illustrates the logical flow for bookmarking a frame of media content in accordance with one or more embodiments of the invention.

At step 1902, a UI component (that includes a circular progress bar and the capability to bookmark selected frames of media content being played) is activated. The UI component includes an icon to enable bookmarking.

At step 1904, a frame within the media content is identified. To identify the frame, the user may pause play of the media content (in the media player), and the identified frame is the frame that is displayed when the media content is paused (i.e., the frame displayed at the pause point).

At step 1906, the identified frame is bookmarked. To bookmark the identified frame, a bookmark icon may be selected/touched thereby associating a bookmark with the identified frame.

At step 1908, a bookmark indicator is displayed on (e.g., coincident with) the circular progress bar. Such a bookmark indicator reflects a location in the media content where the bookmarked frame is located.

At step 1910, the bookmark indicator is selected. In an exemplary embodiment, as the media player is playing the media content, a progress marker moves (i.e., to a location that is different from the location of the bookmark) around the circular progress bar reflecting a progress of the playing. In such an embodiment, the user may select the bookmark indicator by selecting/touching the bookmark indicator (e.g., on a touch screen device) that is coincident/contained within a boundary of the circular progress bar.

At step 1912, the media content is played from the bookmarked frame that was selected (i.e., that was identified by the bookmark indicator that was selected). Step 1912 may also include the pausing of the playback of the media content. When the pause point is located at the frame that has been bookmarked, an option may be provided to remove the bookmark (e.g., by selecting/touching the bookmark twice, touching a trashcan icon, etc.).

Figure 20:
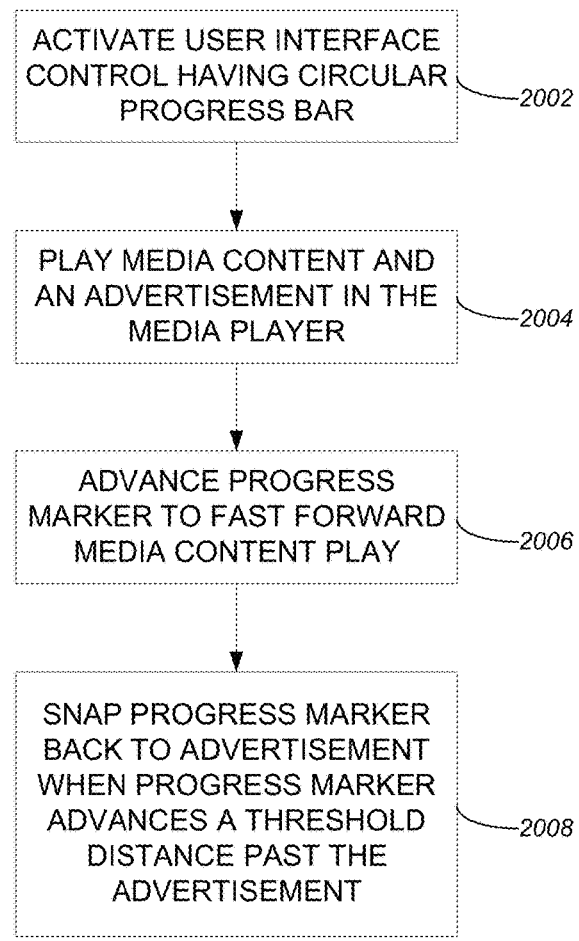
FIG. 20 illustrates the logical flow for preventing the bypass of advertisement viewing in accordance with one or more embodiments of the invention.

FIG. 20 illustrates the logical flow for preventing the bypass of advertisement viewing in accordance with one or more embodiments of the invention.

At step 2002, a UI component/feature (for controlling the playback of media content and advertisement) is activated. (e.g., within a media player on a touchscreen device or on a touchscreen device remote control that controls the media player). The UI component includes a circular progress bar and a progress marker that coincides with the circular progress bar (e.g., is displayed within the boundary region of the circular progress bar). The circular progress bar may also include a scaled circular keyframe (consisting of a preview of a frame of the media content or advertisement) displayed within the circular progress bar.

At step 2004, the media content is played in the media player. As the media content is playing the progress marker moves around the circular progress bar reflecting a progress of the media content being played. Further, at a defined point in the media content, an advertisement is played in the media player.

At step 2006, user input is accepted that advances the progress marker along the circular progress bar to fast forward the media content based on the user input (e.g., a thumb gesture). The user input further includes an attempt to advance the progress marker a defined threshold distance beyond/past the advertisement.

At step 2008, in response to the user input attempting to advance beyond the advertisement, the progress marker is snapped back to the advertisement, thereby preventing bypass of the advertisement. The progress marker may continue to/repeatedly snap back to the advertisement until the advertisement has been viewed (e.g., completely viewed or viewed a threshold amount). The device that the media content user interface control is executing on may vibrate when the progress marker snaps back (thereby providing haptic feedback). Further, the original form of the progress marker may be a geometrical shape (e.g., a circle, square, octagon, etc.). Such a geometrical shape may stretch as the user input attempts to advance progress marker beyond the advertisement. Once the progress marker snaps back to the advertisement, the original form of the geometrical shape may return.

CONCLUSION

This concludes the description of the embodiments of the invention. The following describes some alternative embodiments for accomplishing the present invention. For example, any type of computer, such as a mainframe, minicomputer, or personal computer, tablet device, satellite distribution system, or computer configuration, such as a timesharing mainframe, local area network, or standalone personal computer, could be used with the present invention.

The foregoing description of embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for preventing bypassing of advertisement viewing comprising:
    (a) activating a user interface (UI) component that controls playback of media content and an advertisement in a media player, wherein the UI component comprises:
        (1) a circular progress bar;
        (2) a progress marker that coincides with the circular progress bar; and
        (3) a scaled circular keyframe within the circular progress bar, wherein the scaled circular keyframe comprises a preview of a frame of the media content or advertisement located at a time within the media content or advertisement that is identified by the progress marker;
    (b) playing the media content in the media player, wherein as the media content is playing, the progress marker moves around the circular progress bar reflecting a progress of the media content being played, and wherein at a defined point in the media content, the advertisement is played in the media player;
    (c) accepting user input that advances the progress marker along the circular progress bar to fast forward the media content based on the user input, wherein the user input attempts to advance the progress marker a defined threshold distance beyond the advertisement; and
    (d) in response to the user input attempt to advance the progress marker beyond the advertisement, snapping the progress marker back to the advertisement and thus preventing bypass of viewing the advertisement.

2. The computer-implemented method of claim 1, wherein the UI component is activated within a media player on a touch screen device.

3. The computer-implemented method of claim 1, wherein the UI component is activated on a touchscreen device remote control that controls the media player.

4. The computer-implemented method of claim 1, wherein the progress marker continues to snap back to the advertisement until the advertisement has been viewed.

5. The computer-implemented method of claim 1, further comprising:
when the progress marker snaps back to the advertisement, vibrating a device that the media content user interface control is executing on.

6. The computer-implemented method of claim 1, wherein:
an original form of the progress marker comprises a geometrical shape;
the geometrical shape stretches as the user input attempts to advance the progress marker beyond the advertisement; and
the original form of the geometrical shape returns when the progress marker snaps back to the advertisement.

7. A system for preventing bypass of advertisement viewing comprising:
(a) a media player; and
(b) a user interface (UI) component that controls playback of the media content in the media player, wherein the UI component comprises:
(1) a circular progress bar;
(2) a progress marker that coincides with the circular progress bar, wherein:
(i) as the media content is playing in the media player, the progress marker moves around the circular progress bar reflecting a progress of the playing; and
(ii) at a defined point in the media content, an advertisement is played in the media player; and
(3) a scaled circular keyframe within the circular progress bar, wherein the scaled circular keyframe comprises a preview of a frame of the media content or advertisement located at a time within the media content or advertisement that is identified by the progress marker;
(4) UI means for accepting user input that advances the progress marker along the circular progress bar to fast forward the media content based on the user input, wherein:
(i) the user input attempts to advance the progress marker a defined threshold distance beyond the advertisement; and
(ii) in response to the user input attempt to advance the progress marker beyond the advertisement, the progress marker snaps back to the advertisement preventing bypass of viewing the advertisement.

8. The system of claim 7, wherein the UI component is activated within a media player on a touch screen device.

9. The system of claim 7, wherein the UI component is activated on a touchscreen device remote control that controls the media player.

10. The system of claim 7, wherein the progress marker continues to snap back to the advertisement until the advertisement has been viewed.

11. The system of claim 7, wherein the media content user interface control is executing on a device that vibrates when the progress marker snaps back to the advertisement.

12. The system of claim 7, wherein:
an original form of the progress marker comprises a geometrical shape;
the geometrical shape stretches as the user input attempts to advance the progress marker beyond the advertisement; and
the original form of the geometrical shape returns when the progress marker snaps back to the advertisement.

13. A non-transitory computer readable storage medium encoded with computer program instructions which when accessed by a computer cause the computer to load the program instructions to a memory therein creating a special purpose data structure causing the computer to operate as a specially programmed computer, executing a method of preventing bypass of advertisement viewing, comprising:
(a) activating, in the specially programmed computer, a user interface (UI) component that controls playback of the media content in a media player, wherein the media content user interface control comprises:
(1) a circular progress bar;
(2) a progress marker that coincides with the circular progress bar; and
(3) a scaled circular keyframe within the circular progress bar, wherein the scaled circular keyframe comprises a preview of a frame of the media content or advertisement located at a time within the media content or advertisement that is identified by the progress marker;
(b) playing, via the specially programmed computer, the media content in the media player, wherein as the media content is playing, the progress marker moves around the circular progress bar reflecting a progress of the playing, and wherein at a defined point in the media content, the advertisement is played in the media player;
(c) accepting, in the specially programmed computer, user input that advances the progress marker along the circular progress bar to fast forward the media content based on the user input, wherein the user input attempts to advance the progress marker a defined threshold distance beyond the advertisement; and
(d) in response to the user input attempt to advance the progress marker beyond the advertisement, snapping the progress marker back to the advertisement preventing bypass of viewing the advertisement.

14. The non-transitory computer readable storage medium of claim 13, wherein UI component is activated within the media player on a touch screen device.

15. The non-transitory computer readable storage medium of claim 13, wherein the UI component is activated on a touchscreen device remote control that controls the media player.

16. The non-transitory computer readable storage medium of claim 13, wherein the progress marker continues to snap back to the advertisement until the advertisement has been viewed.

17. The non-transitory computer readable storage medium of claim 13, further comprising:
when the progress marker snaps back to the advertisement, vibrating a device that the media content user interface control is executing on.

18. The non-transitory computer readable storage medium of claim 13, wherein:
an original form of the progress marker comprises a geometrical shape;
the geometrical shape stretches as the user input attempts to advance the progress marker beyond the advertisement; and
the original form of the geometrical shape returns when the progress marker snaps back to the advertisement.

* * * * *